United States Patent
Owen et al.

(10) Patent No.: US 7,373,515 B2
(45) Date of Patent: May 13, 2008

(54) MULTI-FACTOR AUTHENTICATION SYSTEM

(75) Inventors: William N. Owen, Atlanta, GA (US); Eric Shoemaker, Roswell, GA (US)

(73) Assignee: Wireless Key Identification Systems, Inc., Atlanta, GA (US)

( * ) Notice: Subject to any disclaimer, the term of this patent is extended or adjusted under 35 U.S.C. 154(b) by 654 days.

(21) Appl. No.: 10/491,949

(22) PCT Filed: Oct. 9, 2001

(86) PCT No.: PCT/US02/32403

§ 371 (c)(1),
(2), (4) Date: Apr. 7, 2004

(87) PCT Pub. No.: WO03/032126

PCT Pub. Date: Apr. 17, 2003

(65) Prior Publication Data

US 2004/0187018 A1    Sep. 23, 2004

Related U.S. Application Data

(60) Provisional application No. 60/328,310, filed on Oct. 9, 2001.

(51) Int. Cl.
*G06F 9/00*  (2006.01)
(52) U.S. Cl. ........................ 713/182; 713/184; 713/193
(58) Field of Classification Search ................ 713/182, 713/184, 193
See application file for complete search history.

(56) References Cited

U.S. PATENT DOCUMENTS

| | | | |
|---|---|---|---|
| 4,317,957 A | 3/1982 | Sendrow | |
| 5,336,951 A | 8/1994 | Josephson et al. | |
| 5,615,268 A | 3/1997 | Bisbee et al. | |
| 5,901,284 A | 5/1999 | Hamdy-Swink | |
| 6,161,182 A | 12/2000 | Nadooshan | |
| 6,223,289 B1 | 4/2001 | Wall et al. | |
| 2002/0053022 A1 | 5/2002 | Groves et al. | |
| 2002/0056757 A1 | 5/2002 | Matsuyama et al. | |

FOREIGN PATENT DOCUMENTS

WO    WO 01-31840 A1    3/2001

OTHER PUBLICATIONS

Hoogenboom, M. et al, "Security for Remote Access and Mobile Applications", Computers and Security, Elsevier Science Publishers, Amsterdam, NL, vol. 19, No. 2, Feb. 2000, pp. 149-163, XP004204675.

Menezes, Vanstone, Oorschot, "Handbook of Applied Cryptography", 1997, CRD Press LLC, USA, XP002310768, pp. 388-389; 394-397; 549-550; 570-571.

*Primary Examiner*—Thomas R Peeso
(74) *Attorney, Agent, or Firm*—Tillman Wright, PLLC; Chad D. Tillman; James D. Wright

(57) ABSTRACT

A suspect user (110) seeks access to a network resource from an access authority (150) utilizing a passcode received from an authentication authority (130). Initially, an ID of a device is bound with a PIN, the device ID is bound with a private key of the device, and the device ID is bound with a user ID that has been previously bound with a password of an authorized user. The device ID is bound with the user ID by authenticating the user ID using the password. Thereafter, the suspect user communicates the device ID and the PIN from the device over an ancillary communications network (112); the authentication authority responds back over the ancillary communications network with a passcode encrypted with the public key of the device; and the suspect user decrypts and communicates over a communications network (114) the passcode with the user ID to the access authority.

21 Claims, 10 Drawing Sheets

MULTI-FACTOR AUTHENTICATION SYSTEM

A portion of disclosure of this patent document including said computer code contains material that is subject to copyright protection. The copyright owner has no objection to the reproduction by anyone of the patent document or the patent disclosure in its entirety, as it appears in the patent file or records of the U.S. Patent & Trademark Office, WIPO, or other governmental organization, but otherwise reserves all copyrights whatsoever.

FIELD OF THE PRESENT INVENTION

The present invention generally relates to authentication systems and, in particular, to a multi-factor authentication system used for authenticating a suspect user seeking access to a network resource from an access authority of a computer network.

BACKGROUND OF THE PRESENT INVENTION

A user ID and password often is required in order for a suspect user to gain access to a network resource from an access authority of a computer network. In such a system, the network resource may comprise an application, service, or device of the computer network, or even access to the computer network itself. The access authority may comprise a server of the computer network, which grants access once the user ID has been authenticated using the password received from the suspect user. Moreover, the access authority may Include security privileges for granting specific types of access by authenticated users, and the access authority may additionally perform the authentication of suspect users.

The increasing number of systems each requiring a user ID and password in order for a suspect user to gain access to a network resource ultimately confuses users. To reduce confusion, users typically choose easy-to-remember-passwords. Otherwise, users tend to forget complex passwords and record the passwords in easily accessible areas for later reference. For example, many users maintain a list of user IDs and passwords in a spreadsheet or text file on their computer or personal digital assistant. Programs even have been written to help maintain user ID and password combinations.

Enterprises, such as corporations, Internet service providers, portals, application service providers (ASPs), e-commerce providers, online financial services, etc., must manage user IDs and passwords for their users. Allowing users to employ simple passwords reduces security at a time when security attacks are increasing and are increasingly expensive when they occur. On the other hand, enforcing the use of complex passwords and requiring passwords to be changed frequently increases security, but also increases cost in the form of help desk and customer service calls for the resetting of passwords. The systems that have been developed to allow users to use personal information to reset a password automatically without human intervention tend to be less secure because personal information can be guessed or obtained surreptitiously. Some systems, for example, use information from credit reports—despite the fact that credit bureaus are in the business of proactively selling that information.

For user convenience, single sign-on systems also have been developed in which a user is able to authenticate to a single trusted authentication server, which then propagates that authentication to multiple access authorities. While the use of a single authentication server eases the user burden of remembering multiple passwords for accessing various network resources, such a system typically is limited to accessing network resources of a single enterprise. Such a system also is susceptible to a security problem known as "keys to the kingdom." If an attack gains access to the user ID and password required to authenticate to the authentication server, then access to all network resources relying upon that authentication server are compromised.

Stronger forms for authenticating user IDs also have been developed beyond the single-factor authentication employed in using passwords. Notably, hardware token such as USB tokens and time-based tokens—RSA's SecureID is an example—are now being utilized in some multi-factor authentication systems wherein these tokens are able to uniquely identify themselves. For example, a token utilizing physical access to a device and knowledge of a shared secret, such as a PIN, can construct a rotating key that matches a synchronized server key. Such a system is a "two-factor" authentication system because it requires something the user has, i.e., the token, in addition to something the user knows, i.e., the password. Unfortunately, each token in one of these two-factor authentication system is expensive, subject to loss, and typically restricted to use with one or more network resources of a particular computer network.

In view of the foregoing, a need exists for an improved multi-factor authentication system that overcomes one or more of the aforementioned disadvantages of current authentication systems. One or more of these disadvantages are overcome by one or more embodiments of the present invention, as described in detail below.

SUMMARY OF THE PRESENT INVENTION

Briefly described, the present invention relates to multi-factor authentication systems.

A First Aspect of the Present Invention

With regard to a first aspect of the present invention, both a PIN of a user authorized to access a network resource and a first key of an asymmetric key pair of the authorized user are maintained in association with a first primary identification by an authentication authority such that each of the PIN and the first key are retrievable based on the first primary identification. Within this system, a method of the first aspect of the present invention is performed by the authentication authority whereby the authorized user gains access to the network resource from an access authority by utilizing a passcode. The method includes the steps of: receiving the first primary identification and a suspect PIN from a suspect user; authenticating the first primary identification by considering at least one authentication factor, including comparing the suspect PIN with the PIN of the authorized user maintained in association with the first primary identification by the authentication authority; and following a successful authentication of the first primary identification, generating the passcode, encrypting the passcode using the first key of the asymmetric key pair of the authorized user, and communicating the encrypted passcode to the suspect user for subsequent decryption and presentation to the access authority.

The first primary identification may include a device ID and/or a domain ID that identifies the access authority for the network resource. Preferably, the primary identification includes both the device ID and the domain ID. Furthermore, the device ID may be an identification of a personal communications device, such as, for example, a PDA, a mobile phone (cellular or digital), or a two-way pager device like a RIM Blackberry wireless unit.

The authorized user preferably gains access to the network resource over a communications network, and the first primary identification and suspect PIN preferably is received by the authentication authority over a communications medium different from the communications network. The communications network may comprise, for example, the Internet or an intranet. The communications medium may comprise a telecommunications network. Preferably, the suspect PIN is received encrypted with a first key of an asymmetric key pair of the authentication authority, with the key pair of the authentication authority is generally unique to the domain ID.

The method preferably includes the further steps of: receiving a suspect passcode from the access authority; comparing the suspect passcode with the passcode that was encrypted and communicated to the suspect user by the authentication authority; and communicating a result of the comparison to the access authority. Additionally, the passcode preferably must be received by the access authority and/or the authentication authority within a predetermined amount of time after being generated in order for the user to gain access to the network resource. The predetermined period of time preferably is short, such as less than ninety seconds in some instances or less than an hour in other instances.

The passcode communicated to the suspect user preferably is maintained by the authentication authority such that the passcode is retrievable based on a first secondary identification. The first secondary identification comprises the combination of (i) a user ID that represents an identification of the authorized user to the access authority, and (ii) the domain ID. The passcode received by the access authority preferably is communicated to the authentication authority with the user ID.

In a feature of this method, biometric information of the authorized user further is maintained in association with the first primary identification such that the biometric information is retrievable based on the first primary identification, and the step of considering at least one authentication factor by the authentication authority further includes comparing suspect biometric information received with the first primary identification with the biometric information of the authorized user maintained in association with the first primary identification by the authentication authority. Such biometric information may include individual physical characteristics believed to be unique to a user, such as a retinal pattern, fingerprint, or voice pattern.

In another feature of this method, a geographical location for the authorized user is maintained in association with the first primary identification such that the geographical information is retrievable based on the first primary identification, and the step of considering at least one authentication factor by the authentication authority further includes comparing a geographical location identified as the origin of communication of the suspect PIN with the geographic location maintained in association with the first primary identification by the authentication authority.

In yet another feature of this method, a time range for the authorized user is maintained in association with the first primary identification such that the time range is retrievable based on the first primary identification. In this feature, the step of considering at least one authentication factor by the authentication authority further includes comparing with the time range with a time of receipt of the first primary authentication and the suspect PIN. The time range may comprise a window of time or a plurality of discontinuous windows of time for permitted receipt of the suspect PIN, such as during only the daily hours of 6 am to midnight, or only business hours for weekdays and mornings on weekends.

In accordance with the first aspect of the present invention, the authorized user is additionally authorized to access a second network resource, and both a second PIN of the authorized user and a first key of a second asymmetric key pair of the authorized user are maintained by the authentication authority in association with a second primary identification such that each of the second PIN and the first key of the second key pair of the authorized user are retrievable based on the second primary identification. Furthermore, in preferred embodiments the second asymmetric key pair may in fact be the same as the first asymmetric key pair.

Moreover, the method preferably includes the additional steps of: receiving the second primary identification and a suspect second PIN; authenticating the second primary identification by considering at least one authentication factor, including comparing the suspect second PIN with the second PIN of the authorized user maintained in association with the second primary identification by the authentication authority; and following a successful authentication of the second primary identification, generating a second passcode, encrypting the second passcode using the first key of the second asymmetric key pair of the authorized user, and communicating the encrypted second passcode to the suspect user for subsequent decryption and presentation to the access authority.

The second primary identification preferably comprises the combination of the device ID and a second domain ID, and the second passcode communicated to the suspect user preferably is maintained by the authentication authority such that the second passcode is retrievable based on a second secondary identification. The second secondary identification preferably comprises the combination of (i) a second user ID that represents an identification of the authorized user to an access authority with respect to the second network resource, and (ii) the second domain ID.

Additionally, a first key of a second asymmetric key pair of the authentication authority preferably is maintained by the authentication authority in association with the second domain ID such that the first key is retrievable based on the second domain ID, with the second key pair being generally unique to the second domain ID.

A Second Aspect of the Present Invention

With regard to a second aspect of the present invention, both a PIN of a user authorized to access a network resource and a first key of an asymmetric key pair generally unique to a personal communications device of the authorized user are maintained by an authentication authority in association with an identifier such that each of the PIN and the first key are retrievable based on the identifier.

Within this system, the second aspect relates to a method whereby the authorized user gains access to the network resource from an access authority. The method includes the steps of: receiving a challenge request with respect to a suspect user seeking to gain access to the network resource from the access authority; in response to the challenge request, communicating a challenge to the suspect user, receiving a challenge response and the identifier; and authenticating the identifier by comparing the challenge response to a function of the challenge, the PIN maintained by the authentication authority in association with the identifier, and the first key maintained by the authentication authority in association with the identifier. The key pair preferably is generated by the authentication authority and the first key of the key pair is communicated by the authentication authority to the personal communications device of the authorized user. Furthermore, the first key preferably is communicated to the personal communications device of the authorized user upon initial receipt of the PIN from the authorized user for maintaining in association with the identifier.

The function preferably includes the hashing of the challenge, PIN, and first key. The identifier preferably includes a user ID that identifies the authorized user to an access authority that grants access to the network resource and, additionally, a domain ID that identifies the access authority for the network resource. The identifier thus preferably comprises the secondary ID of the aforementioned preferred methods.

In other preferred embodiments of this aspect of the present invention, the function preferably includes the hashing of the (i) challenge, (ii) PIN, and (iii) first key of the asymmetric pair that is generally unique to the user device and that was provided by the authentication authority, as well as (i) a first key of an asymmetric key pair that is generally unique to the user device but that was generated within the device and not provided by the authentication authority, (ii) a first key of a key pair of the authentication authority that is generally unique to the domain ID, and (iii) the domain ID itself.

A Third Aspect of the Present Invention

A third aspect of the present invention relates to a method for gaining access by a user to a network resource. The method includes the steps of: communicating a PIN and a first primary identification over an ancillary communications network to an authentication authority; receiving an encrypted passcode over the ancillary communications network from the authentication authority; decrypting the passcode using a key of an asymmetric key pair; and communicating the passcode and a user ID over a communications network to an access authority. Additionally, the method preferably includes the additional step of manually entering the PIN into the personal communications device for communicating the PIN over the ancillary communications network to the authentication authority. Preferably, the encrypted passcode is received and decrypted by the personal communications device, and the key with which the passcode is decrypted preferably is stored within and generally unique to the personal communications device. The passcode and the user ID also preferably are communicated over the communications network using another device different from the personal communications device, such as a laptop or desktop computer.

The method preferably further includes the step of manually reading the passcode from a display of the personal communications device for communicating the passcode over the communications network. The method also preferably includes the additional steps of communicating a second PIN and a second primary identification over the ancillary communications network to the authentication authority, receiving a second encrypted passcode over the ancillary communications network from the authentication authority, decrypting the second passcode using a key of a second asymmetric key pair; and communicating the passcode and a second user ID over the communications network to another access authority.

A Fourth Aspect of the Present Invention

A fourth aspect of the present invention relates to a method for registering for access by an authorized user with respect to a network resource. The method includes the steps of: generating a first asymmetric key pair generally unique to a device of the authorized user; communicating in association with a device ID of the device to an authentication authority over an ancillary communications network both a first key of the first asymmetric key pair and a PIN of the authorized user; receiving an encrypted registration code over the ancillary communications network from the authentication authority; decrypting the registration code using the second key of the first asymmetric key pair of the device; and communicating the registration code to an access authority over a computer network in associating with a user ID that identifies the authorized user to the access authority. Preferably, the PIN is not stored within the device following its encryption and communication to the authentication authority and wherein the second key of the key pair of the device is not exported from the device.

A Fifth Aspect of the Present Invention

A fifth aspect of the present invention relates to a method in which an authorized user is registered with an authentication authority for later authenticating of a suspect user seeking to gain access from an access authority to a network resource. The method includes the steps of: generating within a device of the authorized user a first asymmetric key pair of the authorized user that is generally unique to the device, and communicating with the device a first key of the first asymmetric key pair in association with a device ID of the device to the authentication authority over an ancillary communications network; receiving and maintaining by the authentication authority the first key in association with the device ID, and communicating by the authentication authority to the device of the authorized user over the ancillary communications network a first key of a first key asymmetric key pair of the authentication authority that is generally unique to a domain ID; encrypting by the authorized user with the device using the fist key of the asymmetric key pair of the authentication authority a PIN of the authorized user that is entered into the device, and communicating by the authorized user the encrypted PIN in association with the device ID to the authentication authority over the ancillary communications network; decrypting by the authentication authority the PIN and maintaining the PIN in association with the device ID and the domain ID, encrypting by the authentication authority using the first key associated with the device ID a registration code, and communicating by the authentication authority the registration code to the device of the authorized user over the ancillary communications network; decrypting by the authorized user within the device the encrypted registration code using the second key of the first asymmetric key pair of the authorized user, and communicating by the authorized user over a communications network the registration code to an access authority in association with a user ID identifying the authorized user to the access authority; and comparing the registration code received with the user ID with the registration code encrypted and sent to the authorized user. Preferably the PIN is not stored within the device following its encryption and communication to the authentication authority, and preferably the first key of the key pair of the device is not exported from the device. Moreover, the first asymmetric key pair of the authorized user preferably is generally unique to the domain ID.

The method preferably further includes the step of communicating by the access authority the user ID and the registration code to the authentication authority, and the step of comparing the registration code received with the user ID with the registration code encrypted and sent to the user is performed by the authentication authority. In this regard, the device ID preferably is communicated by the access authority with the registration code to the access authority. The user ID preferably is maintained by the authentication authority in association with the device ID such that a passcode maintained in association with the device ID is retrievable based on the user ID and/or the device ID.

A Sixth Aspect of the Present Invention

A sixth aspect of the present invention relates to a method of granting access to a suspect user seeking to access a network resource. This method includes the steps of first, (i) maintaining credentials of the authorized user such that the credentials are retrievable based on the user ID, (ii) receiving a user ID, registration code, and suspect credentials, (iii) comparing the suspect credentials with the credentials maintained in association with the user ID, and (iv) upon a successful authentication of the user ID by matching the suspect credentials with the maintained credentials, communicating the user ID and registration code to an authentication authority. The credentials of the authorized user include (i) a password of the authorized user and/or (ii) information transmitted from a token of an authorized user, including a temporal-based or sequential-based value. Thereafter, the method includes the steps of granting access to the network resource to a suspect user upon, (i) receiving a user ID and passcode from the suspect user, (ii) communicating the user ID and passcode to the authentication authority, and (iii) receiving an indication of a successful passcode comparison by the authentication authority.

In accordance with the sixth aspect, the method preferably further includes the steps of additionally receiving suspect credentials with the user ID and passcode, comparing the suspect credentials with the password maintained in association with the user ID, and communicating the user ID to the authentication authority only upon a successful match of the suspect credentials with the maintained credentials.

A Seventh Aspect of the Present Invention

A seventh aspect of the present invention relates to a method of upgrading a single-factor authentication system to a two-factor authentication system wherein a suspect user seeks access to a network resource and the single-factor authentication system includes the binding of a user ID with credentials of an authorized user. The method of the seventh aspect Includes the steps of: (i) initially binding a device ID of a device with a PIN, (ii) binding the device ID with a private key of the device, and (iii) binding the device ID with the user ID, including authenticating the user ID with the credentials; and, thereafter, (i) authenticating the device ID including, as part thereof, communicating from the device the device ID and the PIN over an ancillary communications network, (ii) authenticating the device including, as part thereof, communicating to the device over the ancillary communications network a passcode encrypted with the public key corresponding to the device private key and decrypting the passcode using the device private key, and (iii) communicating the unencrypted passcode over a communications network with the user ID.

Other Aspects and Features

Other aspects of the present invention include, inter alia, computer-readable media having computer-executable instructions for performing part or all of the methods of the aforementioned aspects of the present invention and modifications and variations thereof.

In aspects of the present invention, additional features include: the device as a wireless device, a GPS device, and/or a JAVA-enabled device; the ancillary communications network as a trusted network; the communications network as an untrusted network; and transporting communications over the communications network and/or the ancillary communications network using a secure transport protocol. Moreover, the authentication authority may comprise a program, module, or a server, or refer to an entity maintaining such program, module, or server, and the access authority may comprise a second program, module, or server, or refer to a second entity maintaining the second program, module, or server. In either case, the authentication authority and the access authority preferably are distinct. Indeed, the authentication authority preferably works in conjunction with several access authorities in accordance with these aspects of the present invention.

These and other features of the invention will be more readily understood upon consideration of the attached drawings and of the following detailed description of those drawings and the presently preferred embodiments of the invention.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF PREFERRED EMBODIMENTS OF THE INVENTION

As a preliminary matter, it will readily be understood by those persons skilled in the art that the present invention is susceptible of broad utility and application in view of the following detailed description of the preferred devices and methods of the present invention. Many devices, methods, embodiments, and adaptations of the present invention other than those herein described, as well as many variations, modifications, and equivalent arrangements, will be apparent from or reasonably suggested by the present invention and the following detailed description thereof, without departing from the substance or scope of the present invention. Accordingly, while the present invention is described herein in detail in relation to preferred devices, methods and systems, it is to be understood that this disclosure is illustrative and exemplary and is made merely for purposes of providing a full and enabling disclosure of the preferred embodiments of the invention. The disclosure herein is not intended nor is to be construed to limit the present invention or otherwise to exclude any such other embodiments, adaptations, variations, modifications and equivalent arrangements, the present invention being limited only by the claims appended hereto and the equivalents thereof.

Furthermore, as used herein, "PIN," "passcode," and "password" each broadly refers to a shared secret used for authentication purposes and all are considered synonyms herein, with none intended to imply any particular syntax of the secret itself. The use of "asymmetric key pair" refers to a pair of keys in which that encrypted with at least one of the keys may be decrypted only with the second key. However, in accordance with the present invention, that encrypted with the second key may or may not be decrypted with the first key.

Finally, in accordance with the present invention, "ancillary communications network" and "communications network" identify different communications networks, with the ancillary communications network referring to a communications network between a user and an authentication authority over which a PIN is sent and a passcode is received by the user, and with "communications network" referring to a communications network between a user and an access authority over which the passcode is sent by the user to the access authority. The ancillary communications network preferably comprises a telecommunications network and the communications network preferably comprises a computer network. Furthermore, a network resource preferably is accessed by the user over the communications network through which the user communicates with the access authority. The communications network and the ancillary communications network also may overlap to certain extents such as, for example, where a computer utilizes a telephone line to connect to an Internet service provider.

Figure 1:
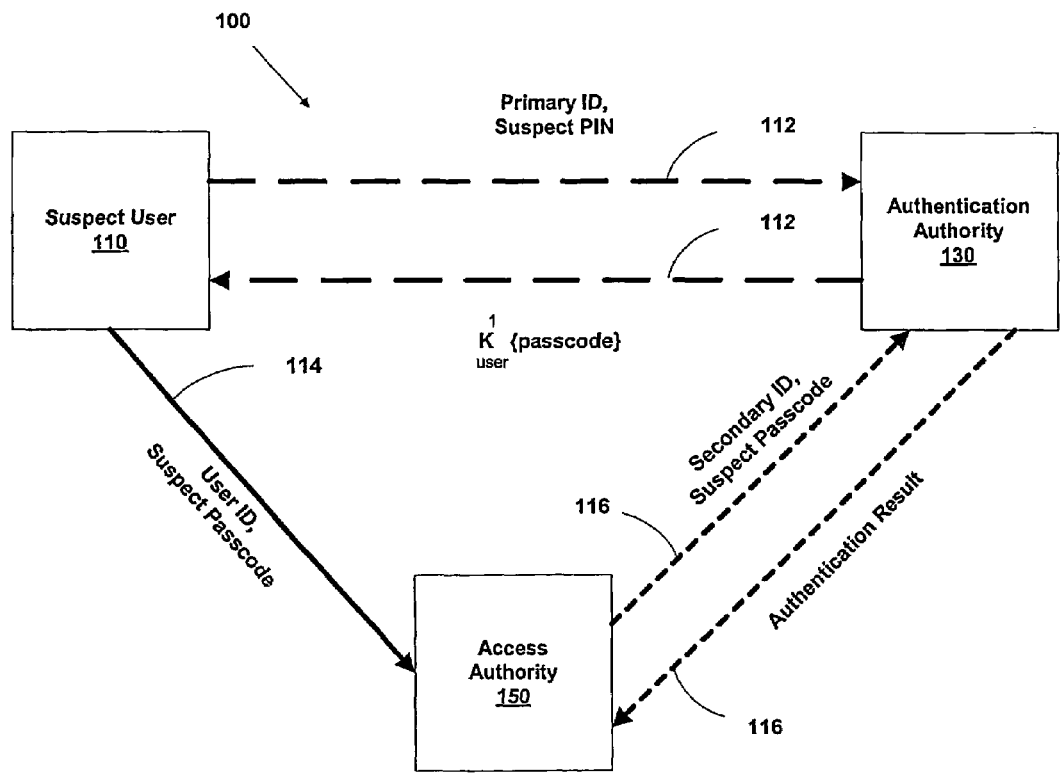
FIG. 1 illustrates a first preferred multi-factor authentication system according to the present invention.

With reference now to FIG. 1, a preferred embodiment of a multi-factor authentication system 100 in accordance with the present invention is illustrated. The system 100 includes a suspect user 110, an authentication authority 130, and an access authority 150. The suspect user 110 seeks to gain access to a network resource from the access authority 150 utilizing an encrypted passcode provided to the suspect user 110 by the authentication authority 130.

Specifically, when the suspect user 110 desires to gain access to the network resource, the suspect user 110 communicates to the authentication authority 130 over an ancillary communications network 112 a primary ID and a suspect PIN. In response, the authentication authority 130 compares the suspect PIN with a PIN of an authorized user that is retrieved based on the primary ID. If the suspect PIN matches the retrieved PIN of the authorized user, and if the primary ID otherwise successfully authenticates, then the authentication authority 130 communicates back to the user 110 over the ancillary communications network 112 a passcode that is encrypted with a first key ($K^1$) of an asymmetric key pair of the authorized user. The authentication authority 130 maintains the passcode in association with the primary ID in the computer-readable storage medium.

The passcode comparison may be the only factor considered by the authentication authority 130 at this time. Alternatively, the authentication authority 130 also may utilize additional factors in authenticating the device ID. Thus, for example, since the device can utilize a telecommunications network such as a wireless network, the geographical location of the user 110 at the time of generating the passcode request can be determined. An authorized user can set the boundaries of the geographical locations from which a valid password request can originate. Additionally, certain time ranges can also be set. Furthermore, a geographical location can be coupled with a time range. For example, on weekdays during working hours, a valid request may only originate from an area around the user's office, while a residence may be valid during the weekends. In addition, the system 100 can track usage patterns and determine if a request is within normal parameters. Furthermore, voice patterns and other biometrics of the user 110 can be stored at the authentication authority 130 and utilized for authentication.

In any event, upon the receipt of an encrypted pass code by the suspect user 110, the suspect user 110 decrypts the encrypted passcode using a second key of the asymmetric key pair and communicates to the access authority 150 over a communications network 114 a suspect passcode and a user ID of the authorized user. The user ID identifies the authorized user to the access authority 150.

The access authority 150, in turn, communicates the suspect passcode and, if the passcode itself also does not already serve as a secondary ID to identify the suspect user 110 to the authentication authority 130, then a secondary ID of the suspect user 110 is also included with the suspect passcode in the communication to the authentication authority 130. The access authority 150 may communicate the suspect passcode over the ancillary communications network 112, the communications network 114, or yet a third communications network, and the particular communications network itself that is utilized by the access authority 150 in communicating with the authentication authority 130 forms no part of the broadest definitions of the invention herein.

In response to the access authority 150 communicating the suspect passcode to the authentication authority 130, and based on the secondary ID of the suspect user 110, the authentication authority 130 then authenticates the secondary ID by comparing the suspect passcode with the passcode previously encrypted and communicated to the suspect user 110. The authentication authority 130 then communicates an indication of the result of the passcode comparison back to the access authority 150. The access authority 150, in turn, grants access to the network resource to the suspect user 110 as a function of the authentication result received from the authentication authority 130. In other words, if the suspect user 110 is an authorized user of the network resource based on the authentication result, then the suspect user 110 is granted access to the network resource by the access authority 150. Conversely, if the suspect user 110 is not an authorized user of the network resource based on the authentication result, then the suspect user 110 is not granted access to the network resource by the access authority 150.

Figure 2:
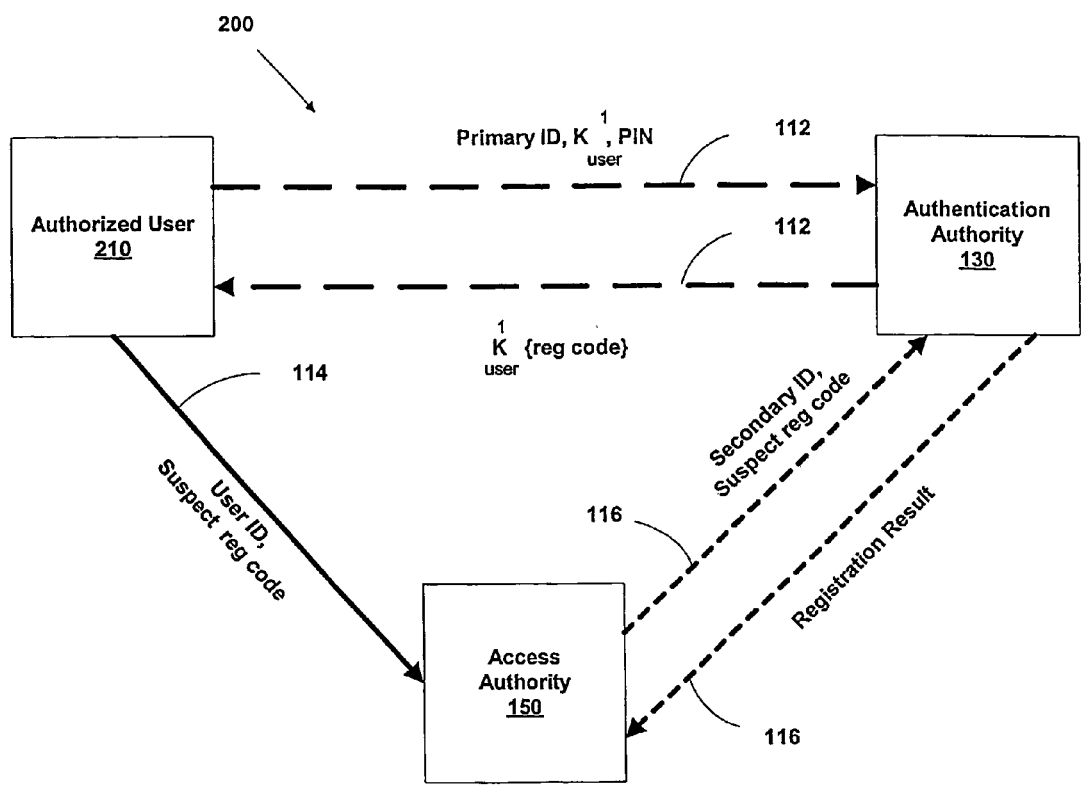
FIG. 2 illustrates a preferred system for user registration for the multi-factor authentication system of FIG. 1.

With reference to FIG. 2, a registration system 200 is illustrated by which an authorized user 210 registers with the authentication authority 130 for later seeking access to the network resource from the access authority 150 in accordance with the system 100 of FIG. 1. The authentication authority 130 is identified by inputting a server code—preferably of only twelve digits—into the user device as more fully described below with reference to commercial embodiments.

In the registration system 200, the authorized user 210 provides his or her primary ID, the first key ($K^1_{user}$), and PIN to the authentication authority 130 over the ancillary communications network 112, and the authentication authority 130 provides its first key ($K^1_{auth}$) to the authorized user 110 together with configuration information. In particular, a preferred sequence of communications in this key exchange includes: first, the provision of the primary ID with a registration request made to the authentication authority 130 and, in response thereto, the provision of the first key ($K^1_{auth}$) of the authentication authority 130 to the authorized user 110; and, second, the provision of the first key ($K^1_{user}$) of the user in combination with the PIN to the authentication authority 130, all encrypted with the first key ($K^1_{auth}$) of the authentication authority 130. Preferably, this key exchange occurs entirely over the ancillary communication network 112.

The authentication authority 130 receives and maintains the first key and PIN of the authorized user 210 in association with the primary ID in a computer-readable storage medium such that each of the first key and the PIN of the authorized user 210 is subsequently retrievable based on receipt of the primary ID of the authorized user 210. The authentication authority 130 then encrypts a registration code (reg code) using the first key of the authorized user 210 and communicates the encrypted registration code to the authorized user 210 over the ancillary communications network 112.

Upon receipt thereof, the authorized user 210 decrypts the encrypted registration code using the second of the asymmetric key pair and communicates the unencrypted registration code together with a user ID to the access authority 150 over the communications network 114. Furthermore, credentials (not shown) of the authorized user 210 preferably are communicated with the user ID and registration code for authentication of the user ID in accordance with the then-current authentication system that is utilized by the access authority 150.

Upon authentication of the user ID using the credentials, the access authority 150 communicates the suspect registration code and a secondary ID to identify the authorized user 210 to the authentication authority 130. The access authority 150 may communicate the suspect registration code and secondary ID over the ancillary communications network 112, the communications network 114, or yet a third communications network 116, and the particular communications network itself that is utilized by the access authority 150 in communicating with the authentication authority 130 forms no part of the broadest definitions of the invention herein.

In response to the access authority 150 communicating the suspect registration code and secondary ID to the authentication authority 130, the authentication authority 130 first confirms that the suspect registration code matches a valid registration code (i.e., one that was previously encrypted and communicated to an authorized user). If so, then the authentication authority 130 associates the secondary ID of the authorized user 210 with the primary ID of the authorized user 210 in the computer-readable storage medium such that any subsequent passcode assigned to or otherwise associated with the primary ID is subsequently retrievable based on receipt of the secondary ID. If the suspect registration code does not match a valid registration code, then no association is made between the secondary ID of the authorized user 210 with the primary ID of the authorized user 210 in the computer-readable storage medium.

The authentication authority 130 then communicates an indication of the result of the registration code comparison back to the access authority 150. The access authority 150, in turn, enables the authorized user 210 for authentication by way of the system 100 if the indicated result from the authentication authority 130 is a successful match.

In preferred embodiment of the systems 100,200, the primary ID includes a device ID of a device of the authorized user in which is generated and stored the second key of the asymmetric key pair of the authorized user. Furthermore, if the passcode does not also function as the secondary ID in the system 100, then the secondary ID includes the user ID, and, upon a successful registration code match by the authentication authority 130 in system 200, the authentication authority 130 associates the secondary ID with the primary ID such that, in the system 100, a passcode associated with the primary ID is retrievable by the authentication authority 130 based upon the later receipt of the secondary ID.

The methods of the systems 100,200 also may be repeated in conjunction with a plurality of access authorities 150 for a single authentication authority 130. In such case, each of the primary ID and secondary ID preferably further includes a domain ID that generally uniquely identifies the appropriate access authority 150 to the authentication authority 130 with respect to the network resource sought to be accessed.

Figure 3:
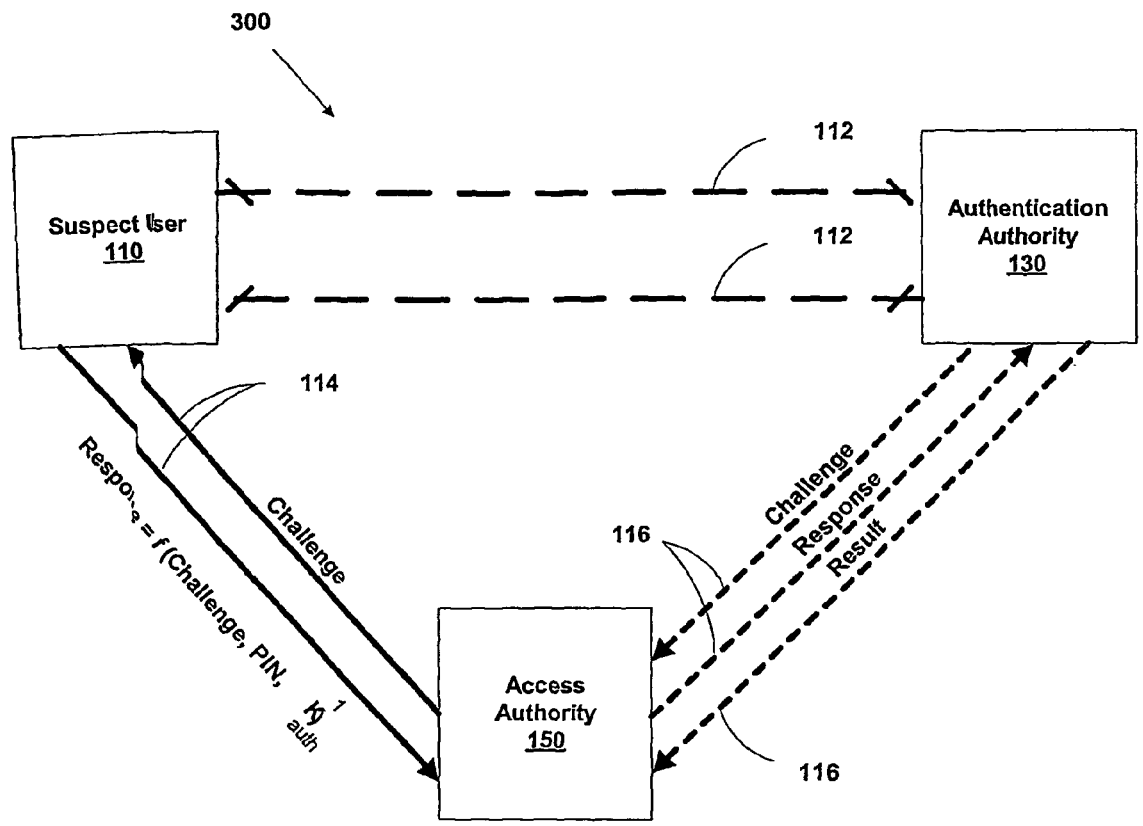
FIG. 3 illustrates a second preferred multi-factor authentication system according to the present invention.

FIG. 3 illustrates another preferred embodiment of a multi-factor authentication system 300 in accordance with the present invention. Like the system 100 of FIG. 1, the system 300 includes a suspect user 110, an authentication authority 130, and an access authority 150. The suspect user 110 also seeks to gain access to a network resource from the access authority 150, but not by utilizing an encrypted passcode received by the suspect user 110 from the authentication authority 130. In the system 300, the suspect user 110 is unable to communicate with the authentication authority over the ancillary communications network 112. This may occur, for example, when the suspect user 110 is out of communications range with the ancillary communications network 112. In this situation, the suspect user 110 nevertheless may be able to communicate with the access authority 150 and the network resource assuming access is granted. Accordingly, the system 300 provides a method by which the suspect user 110 is able to seek and gain access without having to communicate at that time over the ancillary communications network 112.

In accordance with this preferred system 300, the suspect user 110 requests from the access authority 150 access to the network resource preferably by communicating over communications network 114 to the access authority 150 a user ID without a passcode (not shown). The absence of the passcode indicates to the access authority the unavailability of the ancillary communications network 112 to the suspect user 110. Accordingly, the access authority 150 requests from the authentication authority 130 over the communications network 116 a challenge for the secondary ID corresponding to the user ID (not shown).

In response to the challenge request, the authentication authority 130 issues a challenge to the access authority 150 over communications network 116. The access authority 150, in turn, communicates the challenge to the suspect user 110. Alternatively, the access authority 150 may generate the challenge itself.

Upon receipt of the challenge, the suspect user 110 communicates a challenge response back to the access authority 150. The challenge response comprises a function of the challenge itself, a PIN of an authorized user 210, and a first key of an asymmetric key pair that is generally unique to a device ID. The access authority 150 then communicates the challenge response in association with the secondary ID back to the authentication authority 130 over the communications network 116.

Upon receipt of the challenge response and the secondary ID, the authentication authority 130 retrieves, based on the secondary ID, both the PIN of the authorized user 210 and the first key of the asymmetric key pair of the authentication authority 130 for that secondary ID. The authentication authority 130 then reconstructs the challenge response based on the retrieved PIN and first key as well as, inter alia, the challenge itself, and compares the reconstructed challenge response to the challenge response that was received. The secondary ID is authenticated upon the successful matching of the received challenge response with the reconstructed challenge response by the authentication authority 130. The authentication authority 130 then communicates an indication of the result of the challenge response comparison to the access authority 150 over the communications network 116.

Figure 4:
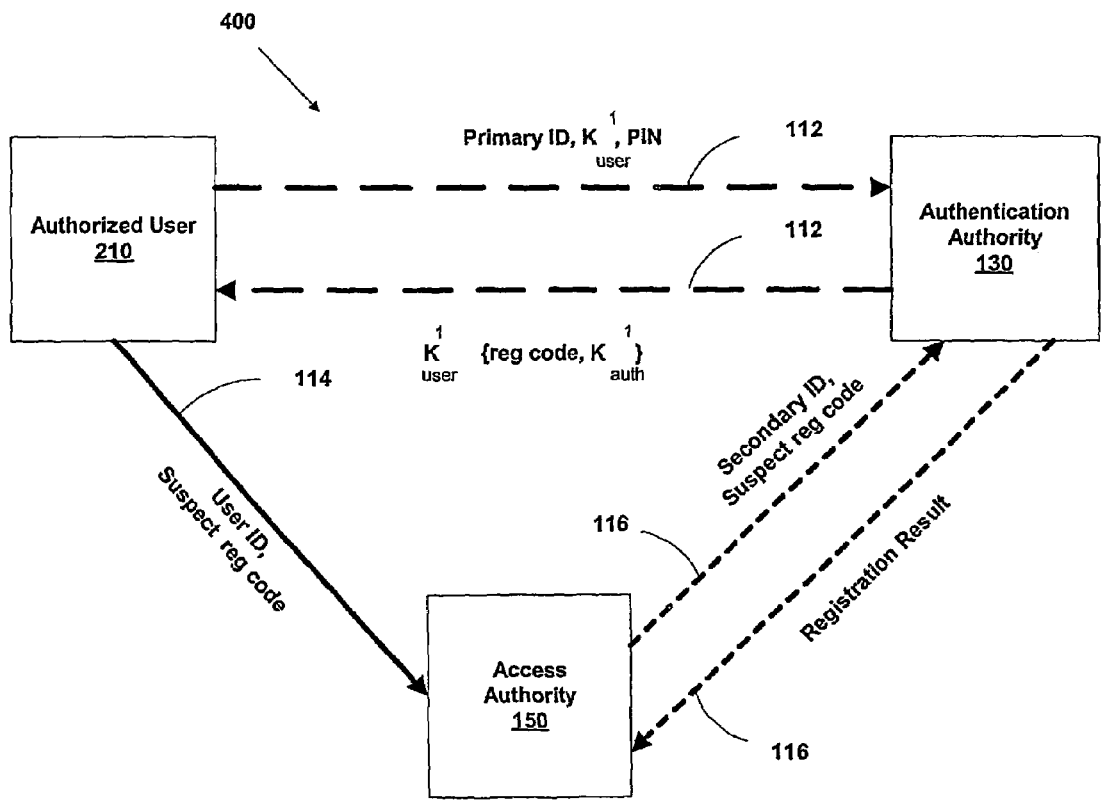
FIG. 4 illustrates a preferred system for user registration for the multi-factor authentication system of FIG. 3.

The key pair of which the first key is utilized in constructing the challenge response preferably is generated by the authentication authority 130 during the registration process. In particular, the first key of the key pair is communicated by the authentication authority 130 to the authorized user 210 during registration process 400 as illustrated in FIG. 4. As will be apparent from a,comparison of FIGS. 2 and 4, the registration processes 200,400 are identical except for the additional inclusion of this first key with the registration code in its encrypted communication over the communications network 112 to the authorized user 210.

Figure 5:
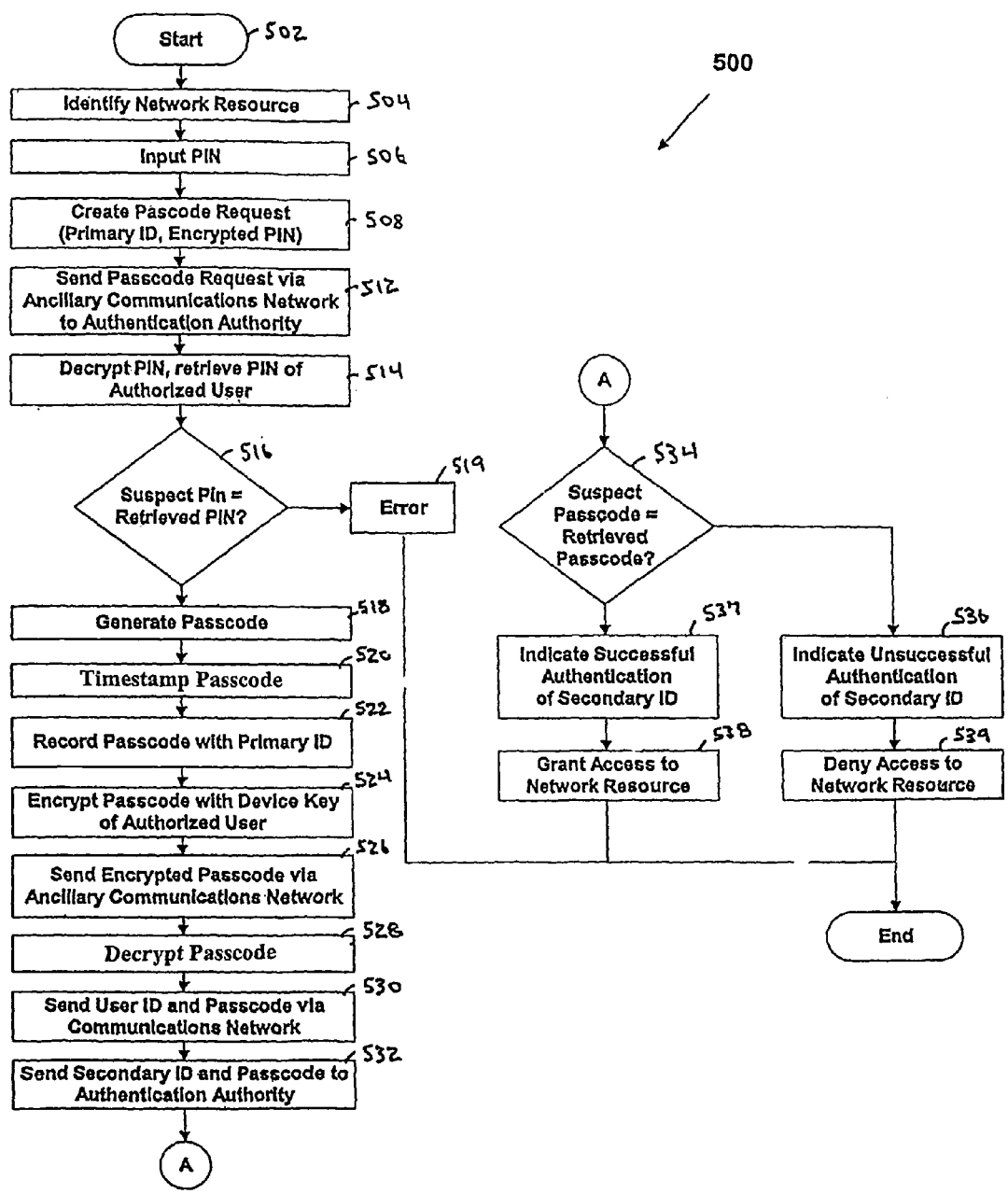
FIG. 5 illustrates a flowchart of steps of a method of the multi-factor authentication system of FIG. 1.

Turning now to FIG. 5, steps of a preferred method 500 of the multi-factor authentication system of FIG. 1 are illustrated, wherein a suspect user requests a passcode to obtain access to a network resource. The suspect user preferably initiates the method 500 when he or she executes a passcode request application on a device of the suspect user. Preferably, the device is a personal communication device of the suspect user. When executed, the application prompts the suspect user to identify (Step 504) the network resource(s) to which access is desired by selecting a domain for the network resource(s). Upon selection of the domain, the application prompts the suspect user to input (Step 506) the PIN previously registered by the authorized user of the device and associated with the selected domain, as discussed hereinafter with regard to FIG. 6.

The application then creates (Step 508) a passcode request containing the primary ID and the PIN input by the suspect user (i.e., the "suspect PIN"). As stated previously, in preferred embodiments, the primary ID includes the device ID of the device possessed by the suspect user. If there is more than one domain for a network resource to which the authorized user is entitled to access, then the primary ID also includes a domain ID (or "domain designation") associated with the domain selected by the suspect user which identifies an access authority for that domain to the authentication authority. Furthermore, the PIN is encrypted using a first key (e.g., "public key") of an asymmetric key pair of the authentication authority prior to its inclusion in the passcode request. The passcode request then is communicated (Step 512) over the ancillary communications network to the authentication authority.

The authentication authority receives the passcode request, decrypts (Step 514) the PIN and compares (Step 516) the decrypted suspect PIN with the PIN of the authorized user that is retrieved based on the primary ID of the passcode request. If the suspect PIN matches the retrieved PIN of the authorized user in Step 516, then the authentication authority generates (Step 518) a passcode. Preferably, the passcode is time stamped (Step 520) and then recorded (Step 522) in association with the primary ID in a computer-readable storage medium. The authentication authority then encrypts (Step 524) the time-stamped passcode using the first key ($K^1$) of an asymmetric key pair of the authorized user and communicates (Step 526) the encrypted passcode over the ancillary communications network to the suspect user. On the other hand, if the suspect PIN does not match in Step 516 the retrieved PIN of the authorized user, then the authentication authority generates and returns (Step 519) an error message to the suspect user indicating that the PIN input by the suspect user is invalid or was incorrectly input into the device.

The suspect user decrypts (Step 528) the encrypted passcode using the device and, specifically, using the second key ($K^2$) of the asymmetric key pair of the authorized user, which is preferably stored within the device. The suspect user then communicates (Step 530) the passcode, which is still considered a "suspect passcode" at this point, and a user ID of the authorized user over the communications network to the access authority.

Upon receipt of the suspect passcode and user ID, the access authority communicates (Step 532) the suspect passcode to the authentication authority for authentication. If the suspect passcode does not already serve as a secondary ID to identify the suspect user (and potentially also the access authority), then the secondary ID is also communicated in Step 532 with the suspect passcode.

The access authority then authenticates the secondary ID of the suspect user by comparing (Step 534) the suspect passcode associated with the secondary ID (as received from the access authority) to the previously generated passcode associated with the primary ID. Preferably, a time stamp associated with the passcode is also used for validation of the suspect passcode.

If the suspect passcode matches the previously generated passcode in Step 534, then the authentication authority indicates (Step 537) to the access authority an indication of the successful authentication of the secondary ID, upon which the access authority then grants (Step 538) access to the requested network resource to the now authorized user. On the other hand, if the suspect passcode does not match the previously generated passcode in Step 534, then the authentication authority communicates (Step 536) back to the access authority an indication of the unsuccessful authentication of the secondary ID, upon which the access authority then denies (Step 539) access to the requested network resource to the suspect user.

Figure 6:
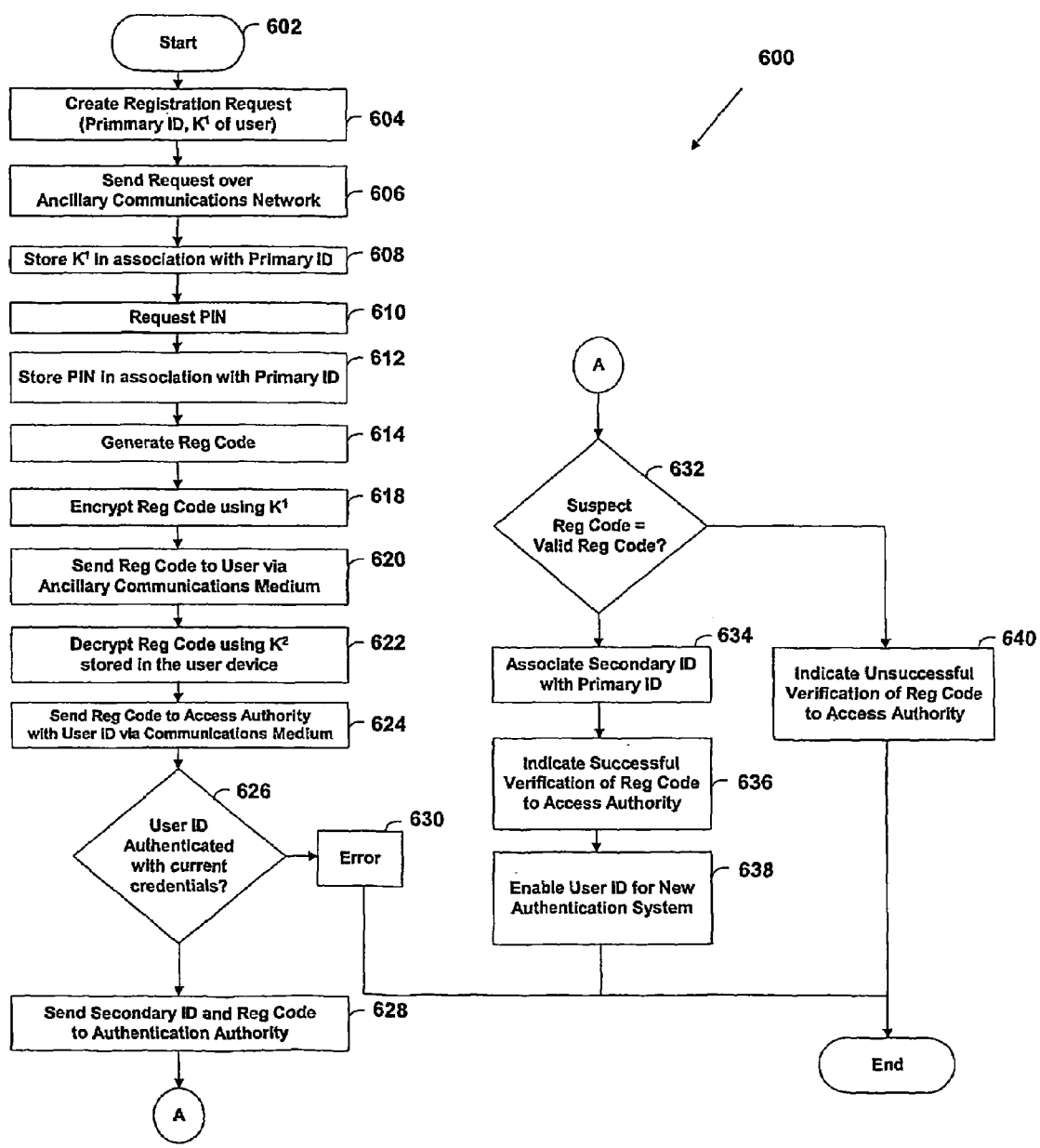
FIG. 6 illustrates a flowchart of steps of a method of the preferred user registration system of FIG. 2.

Turning now to FIG. 6, steps of a method 600 of the preferred user registration system of FIG. 2 are illustrated in which an authorized user registers with the authentication authority for the purpose of later being able to request and obtain a passcode for access to a network resource.

In this regard, to ensure that communications between the authorized user and authentication authority are secure, it is desirable as a preliminary matter for the authorized user to obtain a first key (e.g., public key) of an asymmetric key pair of the authentication authority, whereby communications from the authorized user sent to the authentication authority may be encrypted.

The method begins when the authorized user executes (Step 602) a registration request application on a device of the authorized user. Upon execution, the application creates (Step 604) a registration request containing the primary ID, which preferably includes the device ID of the device and the domain ID for the relevant domain for which registration is being requested, and the first key ($K^1$) of an asymmetric key pair of the authorized user, which key pair is stored on and is previously generated within the device. For security purposes, the registration request is encrypted using the first key of the authentication authority and then communicated (Step 606) to the authentication authority over the ancillary communications network.

The authentication authority decrypts the encrypted registration request and stores (Step 608) the primary ID and first key ($K^1$) in a computer-readable storage medium such that the first key is subsequently retrievable based on the primary ID. The authentication authority then generates a PIN request that is communicated (Step 610) to the authorized user over the ancillary communications network.

In response thereto, the device receives the PIN request and the registration request application then prompts the authorized user to input a PIN for use with the device when requesting a passcode for access to the network resource(s) of the identified domain. In response thereto, the authorized user inputs the PIN into the device in conventional manner (e.g., by inputting the PIN twice to ensure no typographical errors between the two entries). The primary ID and PIN are then communicated (Step 612) to the authentication authority over the ancillary communications network (again encrypted again using the first key of the authentication authority).

In response thereto, the authentication authority decrypts the encrypted primary ID and PIN and stores (Step 614) the PIN in the computer-readable storage medium such that the PIN is subsequently retrievable based on the primary ID. The authentication authority then generates (Step 616) a registration code (reg code), which is encrypted (Step 618) using the first key ($K^1$) of the device, and then communicated (Step 620) to the authorized user over the ancillary communications network.

Upon receipt thereof, the authorized user decrypts (Step 622) the encrypted registration code using the second key of the asymmetric key pair that is stored within the device. The authorized user then communicates (Step 624) the unencrypted registration code together with a user ID to the access authority over the communications network. Other credentials of the authorized user preferably are also communicated with the user ID and registration code in Step 624 for authentication (Step 626) of the user ID in accordance with the then-current authentication system that is utilized by the access authority.

Upon authentication of the user ID in Step 626 using the user credentials, the access authority communicates (Step 628) to the authentication authority the registration code considered by the access authority to be suspect. A secondary ID also is sent with the suspect registration code for purposes of later identifying the authorized user to the authentication authority based thereon. If the user ID is not authenticated with the credentials, then an error is indicated (Step 630) and the method ends.

Upon receipt of the secondary ID and suspect registration, the authentication authority first confirms (Step 632) that the suspect registration code matches a valid registration code (i.e., one that was previously encrypted and communicated to an authorized user). If so, then the authentication authority associates (Step 634) the secondary ID of the authorized user with the primary ID of the authorized user in the computer-readable storage medium such that any subsequent passcode assigned to or otherwise associated with the primary ID is subsequently retrievable based on receipt of the secondary ID. If the suspect registration code does not match a valid registration code In Step 632, then no association is made between the secondary ID of the authorized user with the primary ID of the authorized user in the computer-readable storage medium.

The authentication authority also communicates (Steps 636,640) an indication of the result of the registration code comparison back to the access authority. The access authority, in turn, enables (Step 638) the authorized user for authentication by way of the system 100 if the indicated result from the authentication authority is a successful match.

Figure 7:
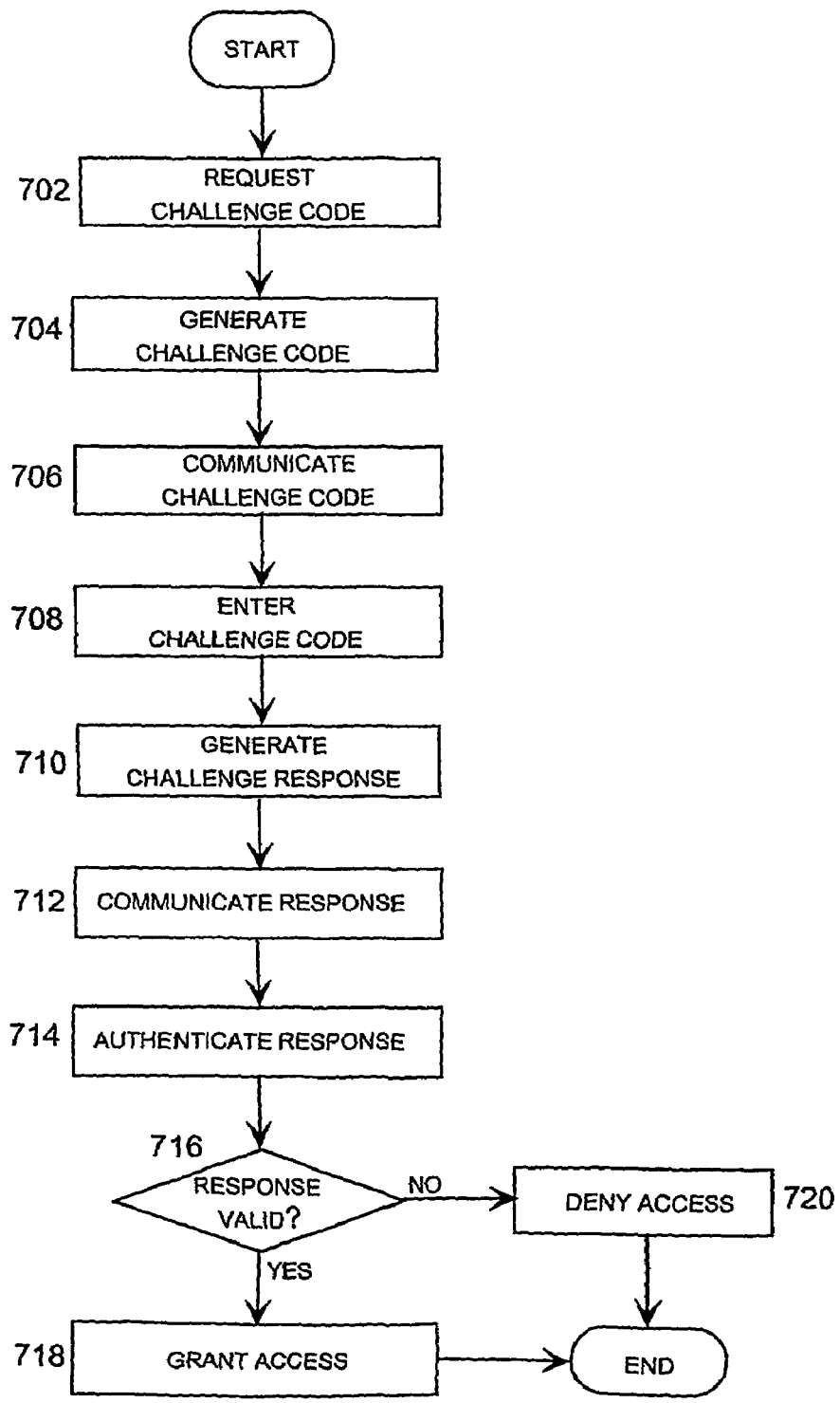
FIG. 7 illustrates a flowchart of steps of a method of the multi-factor authentication system of FIG. 3.

Turning now to FIG. 7, steps of the preferred method 300 of the multi-factor authentication system of FIG. 3 are illustrated. The steps shown begin with a request (Step 702) for a challenge code that is made to the authentication authority by the access authority. In response, the authentication authority generates (Step 704) a challenge code that is then communicated (Step 706) via the access authority to the suspect user seeking access from the access authority to a network resource. The user receives the challenge code and enters (Step 708) the challenge code into the device of the user together with the PIN of the authorized user. The device then computes a challenge response (Step 710) based on a key of an asymmetric key pair of the authentication authority, PIN of the authorized user, and challenge code. The device then displays the resulting challenge response to the user. The challenge response is preferably of manageable size for display and manual reading and entering on a keypad. The user reads the challenge response from a display of the device and communicates (Step 712) it back to the access authority, which in turn communicates it back to the authentication authority with the secondary ID. The authentication authority then authenticates (Step 714) the secondary ID based on the challenge response by reconstructing it. If the challenge response from the suspect user matches in Step 716 the reconstructed challenge response, i.e., the response is valid, then access is granted (Step 718) by the access authority, and if the challenge response from the suspect user does not match in Step 716 the reconstructed challenge response, i.e., the response is invalid, then access is denied (Step 720) by the access authority.

Figure 8:
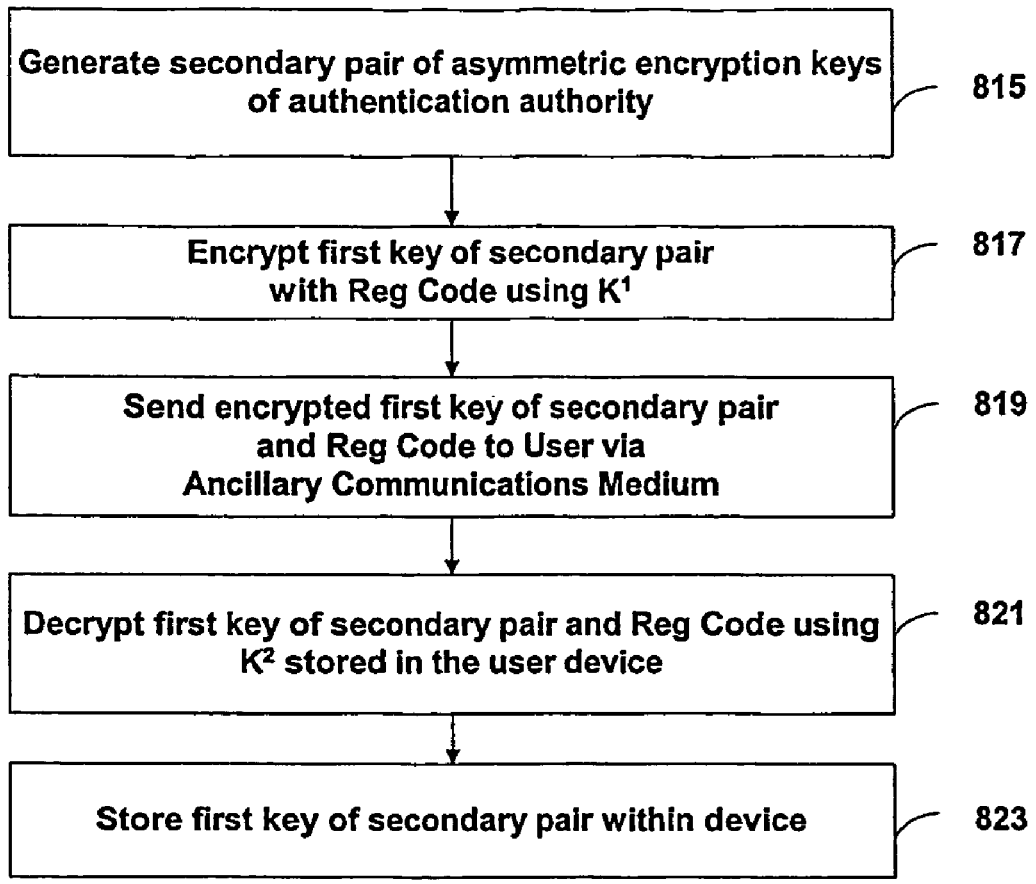
FIG. 8 illustrates a flowchart of steps of a method of the preferred user registration system of FIG. 4.

FIG. 8 illustrates a flowchart of certain steps of the preferred registration process 400 of FIG. 4. As set forth above, the registration process 400 is generally the same as the registration process 200 described above, with the additional steps as identified in FIG. 8. In this regard, these additional steps include: generating a pair of asymmetric encryption keys of the authentication authority (Step 815) which is generally unique to the device of the authorized user that is registering; encrypting (Step 817) the first key, of this secondary together with the registration code that is sent to the authorized user, i.e., encrypting the first key of the secondary pair with the first key of the asymmetric key pair of the authorized user that is received from the authorized user during registration; sending (Step 819) the encrypted first key of the secondary pair and the registration code to the user via the ancillary communications network; decrypting (Step 821) the first key of the secondary pair and the registration code using the second key of the asymmetric key pair of the authorized user; and storing (Step 823) the first key of the secondary pair within the device and using it for computation of a challenge response in accordance with an aspect of the present invention. Because the first key of the secondary pair of the authentication authority preferably is not used but for computation of the challenge response, and because this key is safely stored on the device of the user, matching a received challenge response with a reconstructed challenge response by the authentication entity results in the strong indication that the device of the authorized user actually computer the challenge response.

DETAILED DESCRIPTION OF PREFERRED COMMERCIAL EMBODIMENTS OF THE INVENTION

Commercial embodiments of the present multi-factor authentication system are designed to be commercially viable as a strong multi-factor security system. The commercial wireless authentication system employs new application ready wireless devices as an out-of-band method for receiving passcodes into intranets, virtual private networks (VPNs), highly secured websites, and other access restricted systems. The system utilizes a wireless device as a passcode reception device to gain access on a secure wired network.

The wireless authentication system is designed to be as secure as existing two-factor security systems with significantly less costs to implement and maintain. Like existing two-factor authentication methods, the present commercial wireless authentication system requires the passcodes to be derived and verified in two separate network channels: the wireless network, and the wired, network service. Through verification of the validity of the device and optional triangulation, the passcodes are authenticated and matched against a named user. However, the present authentication system differs from other two-factor systems in several key ways:

1) The intelligence of the passcode generation is not within the client device, preventing theft and reverse engineering;
2) The system is not 100% counter/time/algorithm-based (as are most competing systems), preventing the existence of N+1 and N−1 valid codes as the single-use devices age and lose synchronization;
3) The system generates a code only when requested, not continuously when not needed, which would open the system to algorithm analysis or cracking;
4) The system employs no single-use devices, which eliminates the expenditure for and investment in short-life devices; and
5) The system can support multiple security domains both on the client, to reduce the need for multiple single use devices, and on the server, to enforce flexible security policies.

Instead, the present wireless system uses a portable, multi-function wireless device that is increasingly present in both personal and business environments. Thus, the present wireless authentication system uses a single device for accessing all subscribed systems and enjoys the ultimate portability while avoiding the need for users to install software on each system that they use. Furthermore, the system adds unified identification to the user's existing wireless device providing a versatile multifunction capability and increasing the convenience for the user.

Wireless devices have encapsulated strong unique identification principles and secure protocols for device to server communications. A server based authentication model may be constructed to that equates the unique identification of the wireless device to the unique persona of the device operator. Using shared secrets and secure communication methods, access to the wireless device and the knowledge of user application credentials, a real-time token generation system can be deployed which will provide an extremely secure identification and authentication system.

The present wireless authentication system is based on the unique properties of a wireless device that allows and ensures that transmissions are routed to the correct device. In the attempt to avoid fraudulent use of wireless networks, an infrastructure has been created that when coupled with the various inventions of the present system allows for strong identification and authentication of a user in a system or network environment.

Figure 9:
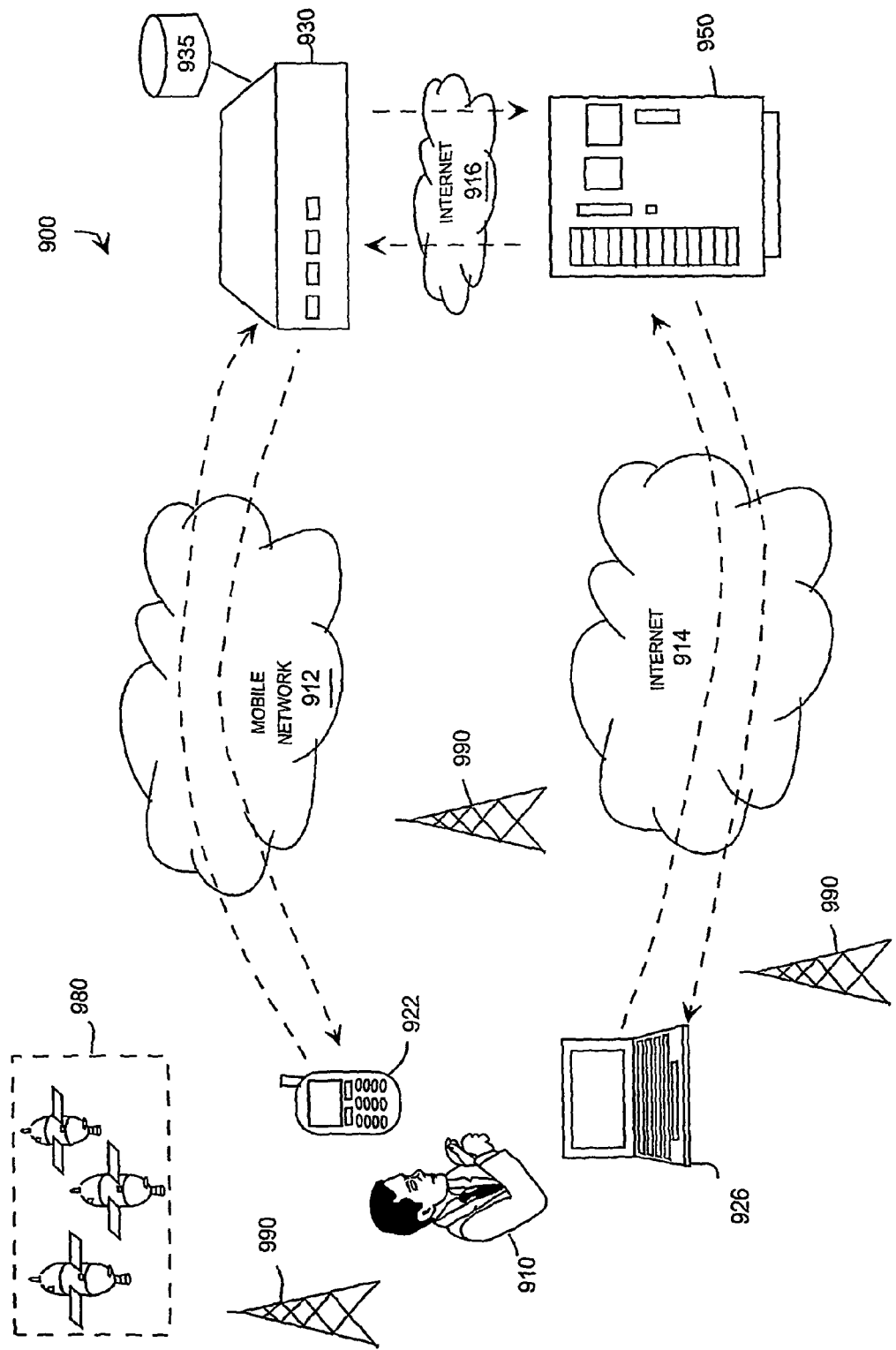
FIG. 9 illustrates a first preferred commercial embodiment of a multi-factor authentication system according to the present invention.

Turning now back to the figures, FIG. 9 provides an overview of the operation of a commercial wireless authentication system 900. As illustrated, the wireless authentication system 900 entails a passcode to be derived and verified in two separate network channels. The passcode is derived over the mobile network 914, while verified over a wired network 914.

A wireless personal communication device 922 is the client platform for the identification of the individual user 914 and utilized for the provision of passcodes. The wireless authentication system 900 supports application ready wireless devices 922 such as RIM BLACKBERRY devices, java-enabled telephones, personal digital assistants (PDAs), WINDOWS CE clients, PALM devices, and the like. In order to utilize the wireless authentication system, a small client application is installed on the wireless device 922. The application manages several processes including key generation, registration, passcode requests, passcode reception, and offline passcode verification, all of which are discussed in greater detail in connection with the following figures.

As previously stated, the wireless device 922 is utilized to obtain a passcode to access a wired authentication server (WAS) 930. The WAS 930 can be configured to operate with any operating system. However, one commercial embodiment runs a hardened version of Linux 2.4.18. The operating system running on the WAS appliance can be hardened in the following ways:

1) The engineering staff applies security kernel patches, system patches and application patches.
2) All processes run under an unprivileged user, including application processes, application server processes, protocol modules and database server processes.
3) All unnecessary services, including network services such as telnet, ftp, line printer, etc. are removed from the system, if possible, or disabled.
4) A netfilter IP-tables firewall process is created and configured to remove access to unwanted and unneeded processes, applications and ports.
5) Access to any process—most importantly the terminal services, file transfer services and database administration services—are conducted over an encrypted connection (SSH2) and negotiated through public key exchange.
6) Additionally, inherently non-encrypted services (like database administration services) are conducted over a SSH2 tunneled connection.
7) All internal services are conducted over an access controlled loop back service.

8) All file system, application and system services are set to deny access by default.

9) All elements within the file system are set to read-only and accessed by an unprivileged user.

10) Buffer overruns, unchecked variables and other application weaknesses are protected.

11) Access to the cryptographic keys and database passwords is via a protected process. The keys and passwords never appear in plain text on the file system.

Additionally, in this embodiment, the WAS 930 uses mainly JAVA-based server components and application components. The underlying database 935 is an embedded version of Sybase, which is self-contained and does not require database administration. The WAS database 935 is a database of domains, devices, users, and protocol modules.

In order for the WAS 930 to communicate with network clients 950, the WAS 930 has installed the appropriate protocol modules. One embodiment supports Remote Authentication Dial In User Service (RADIUS) and a proprietary wireless authentication system protocol.

RADIUS is a standard TCP/IP based service for authorization and access control. The RADIUS protocol is detailed within the Internet Engineering Taskforce RFC 2865 with additional information provided by RFC's 2866 to 2869. The RADIUS protocol can be less secure than proprietary protocols since it utilizes a MAC encoding of the packets within the protocol exchange. Consequently, it is normally utilized on trusted networks, e.g., corporate Intranets, or to support standard VPN and dial-in clients. RADIUS is supported by Microsoft's RAS, Cisco's routing and firewall software as well as by most of the terminal and PPP device makers. The WAS 930 can support fully RADIUS authentication and less fully RADIUS accounting and proxy features.

The proprietary protocol is encrypted for the verification of passcodes from certain network clients 950. The proprietary protocol can be more secure than RADIUS since it can utilize full asymmetric payload and transport encryption, but it requires use of an application component to be implemented within a network client 950. Typically, the component is a JAVA bean that can be integrated into a website, a web application, a client-server application or as a forwarding service within an LDAP service.

In addition, the WAS 930 can offer a web-based administrative utility for the management of the server components. The WAS 930 can provide a fully web-enabled administration utility to create, modify, enable and disable each of the components utilized. Most of the WAS 930 administration is completed using an administration application. This entirely web-based system provides administration of wireless devices 922, security domains, users 910, protocol modules, network clients 950 and preferences. In addition, the application provides access to logs, reports, statistics and help.

Network clients 950 provide network services on the wired network channel 914. They can vary greatly in their implementation, depending on the requirements of the organization that deploys the wireless authentication system 900. For example, a network client 950 can be a firewall that provides VPN services to a partner extranet (via RADIUS) or a private website that provides sales support services (via a proprietary protocol over SSL). The options are limitless as long as the network client implements either RADIUS (as most network devices), a proprietary protocol through an application component, or other future standard protocols adopted for authentication or access control.

The network clients 950 are accessed by users 914 desiring access to a network service on a wired network 914. The WAS 930 employs the mobile network 912 for receiving the passcodes for authorization into intranets, VPNs, and highly secure websites. The passcode reception process and passcode provision process are conducted over two separate and distinct channels. One channel is the untrusted wireless network 912 (or trusted private wireless network for telecoms), while the other is an untrusted or trusted wired network 914. Strong encryption should be utilized when transmission takes place on an untrusted network. In short, the passcode is received on one band by the wireless device 922 and provided on another by any separate computing device 926 that can access the wired network 914. The transfer between the bands is accomplished manually by the user 910.

In order to gain access to a secure network resource, the user 910 initiates a passcode request by selecting a domain and entering a PIN for the selected domain. The PIN was created during a registration process discussed later in greater detail. The wireless device application generates the passcode request. The passcode request consists of payload that includes a device identification (device ID), the PIN, and a server identification (server ID) encrypted with general server key provided in the registration process. The passcode request is transmitted to the wireless authentication server (WAS) 930 over an encrypted SSL connection.

After receiving the passcode request, the WAS 930 decrypts the request with its local server key. The server looks up in an associated database 935 the requesting wireless device for the selected domain using the device ID and verifies the PIN.

In addition, the WAS 930 may use location information as part of the authentication process. A wireless network 912 can provide geographic location information by using triangulation of the originating communication. The triangulation can be accomplished by the signal strengths received at various network towers 990 in the wireless network system 912. Furthermore, many wireless devices include built in GPS location service that using the known GPS system 980. Consequently, these enabled wireless devices 922 can provide exact location information. A user 910 can specify valid geographic boundaries for the origination of a passcode request such as an office, residence, airport, city, state, or other geographic area. Likewise a user 910 can specify time ranges for a valid request such as weekdays during normal work hours. Clearly, geographic location and a time range can be merged such that a valid request can be from an office during normal work hours and a residence during off hours. Furthermore, usage patterns can be tracked and deviations from a pattern can trigger additional security requirements.

If the authenticating information is validated, the WAS 930 creates a passcode that is encrypted with the general device key. The passcode is time stamped and valid for only a predetermined time period based upon the security requirements of the domain. Typically, a passcode is valid only for 60 seconds or 90 second. However, it is conceivable passcodes could be valid up to a month or more depending on the sensitivity of the network resource. The WAS 930 returns the passcode to the wireless device 922 via SSL.

When the passcode is received, the message is decrypted with the device local key. This key is unique to the domain and has never been transmitted from the device 922. The passcode is displayed on the device 922 and the user 910 can use the passcode to gain access to the network service 950.

Before a wireless device 922 can communicate with the WAS 930, the device 922 is first registered within the WAS 930 and associated with a security domain. In this commercial embodiment, each supported security domain requires approximately 1200 bytes of storage on the wireless device 922. There are two main methods for registering a device 922:

If the domain is configured for auto-registration, the wireless device 922 can request registration through the client application. First, the user 910 uses the client application to request that the device 922 be added to the WAS 930 and security domain in question. A server code is entered by the user 910. This server code can be provided by a technical security staff or automatically displayed to the user 910 upon successful entry into an existing security system Once this 12-digit server code has been entered into the device 922, the user 910 establishes a PIN for the domain connection. A separate PIN can be provided for each domain, and it is recommended that the user 910 establish unique PINs for each domain. At this point In the process, the general device key that was generated in the key generation process is provided to the WAS 930. The WAS 930 will then record the cryptographic key and provide the domain's general key, a unique identifier for the instance of the device within the security domain and a large registration code. Additionally, the server 930 will generate a second set of keys unique for that particular client device 922 in the security domain for offline passcode verification.

The registration code is a one-use temporary element. It is not a passcode or password and cannot be used for access into a network resource 950. Instead, the registration code is used to associate the wireless device 922 with a known user 910 within a trusted system. It is possible that the association can take place outside of the wireless authentication system 900; however, in most cases, it will be on a registration website within the administration system. When the user 910 goes to the registration website (or other registration system), the user 910 may be required to enter an existing user ID, identifying information, and the registration code. The identifying information is the credentials that are acceptable to the network client for validating a user 910. This process associates the wireless device 922 with the user 910, verifies the wireless device 922 as valid within the security domain and activates the wireless device 922 within the security domain.

If the domain is not configured for auto-registration, much of the auto-registration process is still followed. The key exchange is same. One major difference is in the final registration step. Instead of the user 910 completing this step, the administrator of the WAS 930 would associate the wireless device 922 with the user ID and security domain and enable it. The manual process can be used when an existing user 910 joins the system 900 and continuity with the existing system is desired.

The WAS 930 stores named users and associates each user 910 with a device 922 and a security domain. This process allows for login within a network service, whether it is via a RADIUS-based VPN, secure website, or any other service that is provided by a network client 950.

The WAS 930 contains a database 935 of domains, devices, users, and protocol modules. Additionally, the WAS 930 also offers a web-based administrative utility for the management of these components. Each instance of authorization, the WAS 930 runs under a particular security domain. The security domain is intended to segregate users 910 with respect to access and services. For example, Intranet access may be provided with one domain, partner extranet access with another, and public Internet (Website) access with a third. Separate security policies can be provided for each domain and access can be granted on a device/individual user basis. Unlike other systems, the client for each domain (the wireless device 922) is the same. Upon creation, each domain generates a key pair for payload encryption within the passcode request/passcode reception process. These keys are the domain local key and the domain general key and are exchanged in the registration process.

The cryptographic signature or device profile for each wireless device 922 is stored within the WAS 930 and associated with a domain 950 and user 922. In the case of encrypted mode (recommended since the wireless network 912 is untrusted), the cryptographic signature is a 1024 bit-equivalent general device key as generated in the registration. This strong, asymmetric encryption key is generated on the device 922 and serves to identify a valid device 922 within the security domain and to provide payload security during the reception of passcodes. The device 922 also receives, stores and utilizes the public key of the WAS 930, which is provided by the server 930 during the registration process. Once these keys are exchanged and the device-domain PIN established, the wireless device 922 becomes a registered or trusted device.

When the application is started for the first time, the application automatically generates a key pair: a local device key and a general device key. These keys are used for the decryption of the payload from the WAS 930 and identification of the device 922. The keys are asymmetric, and the strength of the key pair is approximately equivalent to RSA1024 bits. The time for the key generation process averages 14 seconds.

The commercial embodiment uses the NTRU algorithm from NTRU Cryptosystems, Inc. for this key generation and in turn for the payload encryption. It is generally accepted that the encryption strength of the NTRU modified lattice algorithm is approximately the same as existing elliptical curve or RSA asymmetric algorithms. However, with the inferior computing power of wireless devices 922, the NTRU algorithm is superior because it is much, much faster when running on the device 922. For security reasons, it is preferred that the key generation be completed on the device 922, not on a PC 926 or server and transferred to the device 922. In this way the local device key never leaves the device 922 and is not subject to interception, electronic copying or redistribution. Thus, the wireless device 922 functions similarly to a smart card. But unlike a smart card, it does not require a wired reader, which greatly reduces the cost of implementation and greatly increases portability.

When a security domain is created within the WAS 930, two keys are generated for the domain: 1) the server local key $\{SK^1\}$ and the general server key $\{SK^2\}$, these keys roughly relate to the security domain's public and private key respectively; however, terminology used by the NTRU algorithm does not match RSA's terminology precisely. At the initiation of the client applications the device creates a key pair the local device key $\{CK^1\}$ and the general device key $\{CK^2\}$.

When communication is initiated by an unregistered device 922, the device 922 communicates with the WAS 930 based on the "server code" $\{SC\}$ entered by the user 910. This code is either a zero-padded IP address representing the address on the Internet or a 12-digit alias within the systems net namespace (for ASP services). After resolving the address {RA} of the target, the devices will request the following URL and POST {CK²} to <stdin> via https:

https://<{SC}|{RA}/wikid/servlet/InitDeviceS?a=0&S={SC}

The server 930 expects exactly 255 bytes for the {CK²}. The server 930 will encrypt the following message:

CK²{[UTF encoded string][int][int][long][int][bytes]}

Corresponding to:

CK²{[domain name][minPIN][PIN TTL][device ID({DID})]|[SK² length][{SK²}]}

The typical length of the reply (after expansion) is approximately 3526 bytes depending on configuration and length of {SK²}. The device should decrypt string with {CK¹} and prompt for PIN, utilizing the minPIN. The PIN selection is then encrypted with {SK²} and POSTed to:

https://<{SC}|{RA}/wikid/servlet/InitDevicesS?a=1&d={DID}&s={SC}

The server will expect 251 bytes on <stdin>. The server decrypts with {SK¹} and verifies. Then, the server replies with the following encrypted message:

CK²{[reg code {RC}]}

Typical length is 263 bytes (251 bytes+[http overhead]). The device should enable and display the domain name. In order to increase the system security, the PIN and {RC} are not stored on the device in case of theft. The wireless device 922 is not enabled until the registration is complete on the second, wired channel network 914. The remainder of the registration generally takes place within the wired channel network 914.

Without strong encryption, the system 900 would not be as secure as current two-factor systems. Simply put, the weakness of using an untrusted network channel, namely the wireless network, is significant without strong cryptography. Therefore, the client software employs standard 128-bit SSL for transport security. In addition, the wireless authentication system 900 encrypts the payload of the passcode request and passcode reception as previously noted. This allows for process-to-process encryption in addition to the application-to-network service encryption provided by SSL. On the Java phones SSL is supported by the MIDP system; on the BLACKBERRY it is accomplished with a proprietary MOBITEXT gateway.

Network clients 950 provide network services on the wired network channel 914. They can vary greatly in their implementation, depending on the requirements of the organization that deploys the wireless authentication system 900. For example, a network client 950 can be a firewall that provides VPN services to a partner extranet (via RADIUS) or a private website that provides sales support services (via a proprietary protocol over SSL). Those skilled in the art will acknowledge that the options are limitless. However, for a network client 950 to become active within the WAS security domain, it is first registered. The registration of network clients is accomplished through the administration system.

In the commercial embodiment, it is the responsibility of the network client 950 to provide passcodes via a computer network 916 for verification by the WAS 930. Typically, the network client 950 will provide to the WAS 930 the passcode and the user ID. The network client 950 does not verify the code itself; instead it provides the code to the WAS 930 through the chosen protocol. When the result (acceptance or denial) of the code is returned from the WAS 930 via the computer network 916, the network client 950 acts upon the acceptance (or denial). In the case of RADIUS devices, the network is devices 950 are by design programmed to act on the acceptance or denial of the code. In the case of network clients 950 using a proprietary protocol, the appropriate access granting action should also be taken.

Figure 10:
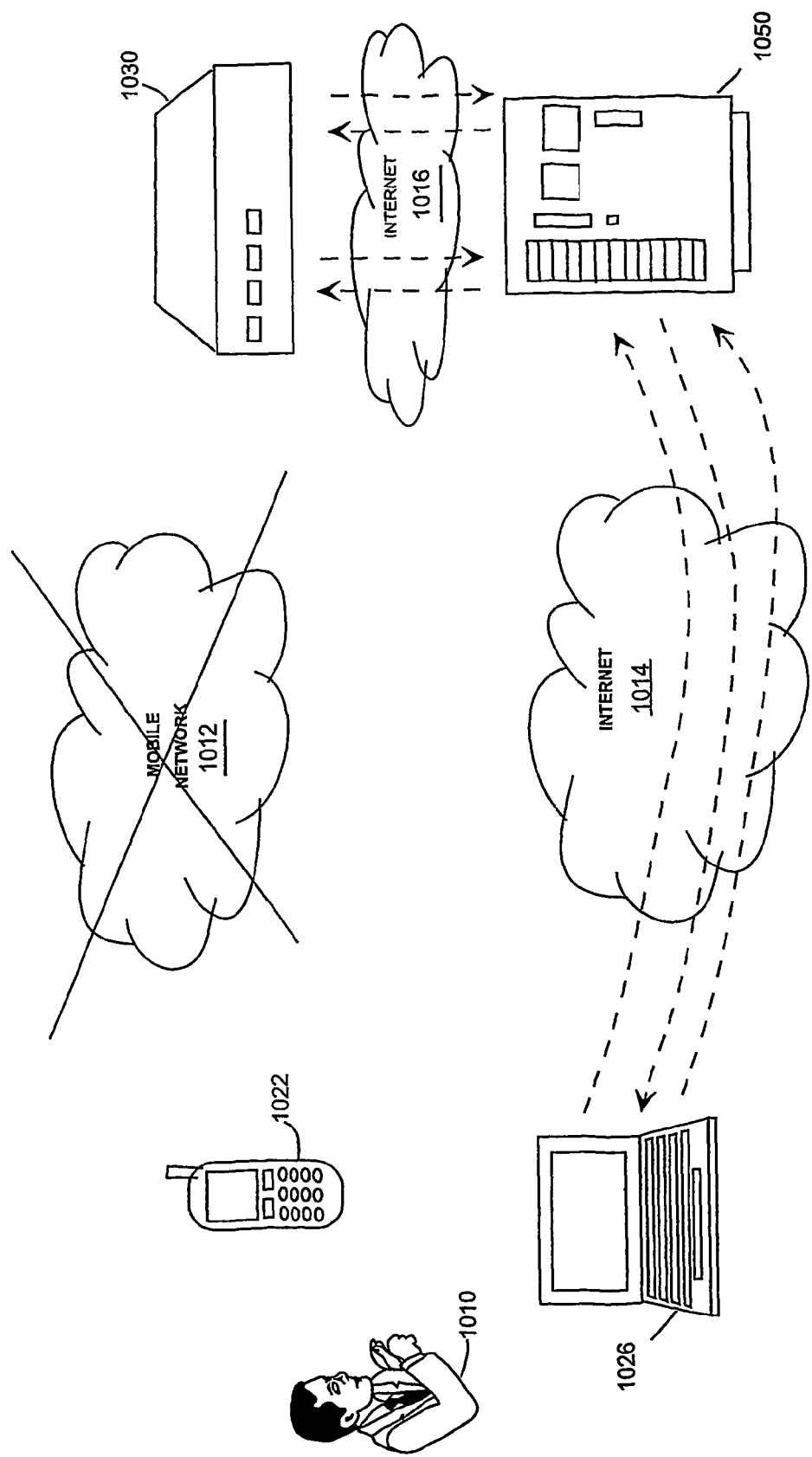
FIG. 10 illustrates a second preferred commercial embodiment of a multi-factor authentication system according to the present invention.

Turning to FIG. 10, illustrated is a commercial embodiment for offline passcode verification. Offline passcode verification is utilized when the wireless network 1012 is not accessible. This state may be due to the user 1010 being out-of-range of wireless network 1012 or for other reasons.

When the WAS 1030 can not be reached by a wireless device 1022, the offline verification process can be instituted by the network client 1050. Based on the user's action, the network client can request a challenge code from the WAS 1030, rather than requesting a passcode verification. This action can be taken in response to the user 1010, not providing any response to a passcode input field over a computer network 1014 from a computing device 1026.

Upon receiving a null code for the passcode, the WAS 1030 provides a large (usually 12 digit) code for the challenge code to the network client 1050 over a computer network 1016. The network client 1050, in turn, displays the challenge code to the user 1010.

The user 1010 runs a client application on the wireless device 1022 in offline mode and enters the challenge code into the device 1022. The device 1022 assembles the following message: [general device key|PIN for domain|challenge code] (separators are shown for readability) and encrypts it with a secondary general server key used only for offline verification. This key pair is specific to the wireless client 1022 and the security domain. The encrypted payload is hashed with SHA1 producing a 20 byte string of ASCII characters. The string is base62 encoded and displayed to the user 1010.

The user 1010 then returns to the process associated with the network client 1050, such as web page login or terminal server login, and enters the resulting message as an answer to the challenge.

The challenge answer is provided by the network client 1050 to the WAS 1030 over an encrypted (or in the case of RADIUS encoded and through CHAP) connection 1016. The WAS 1030 decrypts the message with the server local key for offline verification, repeats the message creation above and compares the SHA1 hash. The result of the challenge verification is returned to the network client 1050. Based upon the result, the network 1050 can grant or deny access.

In view of the foregoing detailed description of preferred embodiments of the present invention, it readily will be understood by those persons skilled in the art that the present invention is susceptible of broad utility and application. While various aspects have been described in particular contexts of use, the aspects may be useful in other contexts as well. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. In a system wherein both a PIN of a user authorized to access a network resource and a first key of an asymmetric key pair of the authorized user are maintained in association with a first primary identification by an authentication authority such that each of the PIN and the first key are retrievable based on the first primary identification, a method performed by the authentication authority whereby the authorized user gains access to the network resource from an access authority with a passcode, the method comprising the steps of:
    (a) receiving the first primary identification and a suspect PIN from a suspect user;
    (b) authenticating the first primary identification by considering at least one authentication factor, including comparing the suspect PIN with the PIN of the authorized user maintained in association with the first primary identification by the authentication authority; and
    (c) following a successful authentication of the first primary identification,
        (i) generating the passcode,
        (ii) encrypting the passcode using the first key of the asymmetric key pair of the authorized user, and
        (iii) communicating the encrypted passcode to the suspect user for subsequent decryption and presentation to the access authority.

2. Computer-readable medium having computer-executable instructions that perform a method comprising the steps of:
    (a) maintaining a PIN of an authorized user of a network resource and a first key of an asymmetric key pair of the authorized user in association with a primary identification such that each of the PIN and the first key are retrievable based on the primary identification;
    (b) retrieving the PIN of the authorized user based on the primary identification received over an ancillary communications network and comparing the retrieved PIN with a suspect PIN also received over the ancillary communications network with the primary identification;
    (c) generating a passcode and encrypting the passcode using the first key of the asymmetric key pair of the authorized user for communicating back over the ancillary communications network;
    (d) maintaining the passcode in association with a secondary identification such that the passcode is retrievable based on the secondary identification; and
    (e) retrieving the generated passcode based on the secondary identification that is received and comparing the retrieved passcode with a suspect passcode also received with the secondary identification.

3. In a system wherein both a PIN of a user authorized to access a network resource and a first key of an asymmetric key pair generally unique to a personal communications device of the authorized user are maintained by an authentication authority in association with an identifier such that each of the PIN and the first key are retrievable based on the identifier, a method performed by the authentication authority whereby the authorized user gains access to the network resource from an access authority, the method comprising the steps of:
    (a) with respect to a suspect user seeking to gain access to the network resource from the access authority, receiving a challenge request from the access authority in association with an identifier;
    (b) in response to the challenge request, communicating a challenge to the access authority;
    (c) receiving from the access authority a challenge response and the identifier; and
    (d) authenticating the identifier by comparing the challenge response to a function of,
        (i) the challenge;
        (ii) the PIN maintained by the authentication authority in association with the identifier; and
        (iii) the first key maintained by the authentication authority in association with the identifier.

4. A method for gaining access by a user to a network resource, comprising the steps of:
    (a) communicating a PIN and a first primary identification over an ancillary communications network to an authentication authority;
    (b) receiving an encrypted passcode over the ancillary communications network from the authentication authority;
    (c) decrypting the passcode using a key of an asymmetric key pair; and
    (d) communicating the passcode and a user ID over a communications network to an access authority.

5. Computer-readable medium having computer-executable instructions that perform a method comprising the steps of:
    (a) generating an asymmetric key pair generally unique to a domain ID;
    (b) communicating a first key of the asymmetric key pair in association with a device ID to an authentication authority over an ancillary communications network;
    (c) receiving a PIN from a user through user-input of the device;
    (d) communicating the PIN and a first primary identification over the ancillary communications network to the authentication authority;
    (e) receiving an encrypted passcode over the ancillary communications network from the authentication authority;
    (f) decrypting the passcode using the second key of the asymmetric key pair; and
    (g) displaying the passcode to the user.

6. The computer-readable medium of claim 5, wherein the first primary identification comprises the device ID and the domain ID.

7. The computer-readable medium of claim 5, wherein the method includes the further steps of:
    (a) generating a second asymmetric key pair generally unique to a second domain ID;
    (b) communicating a first key of the second asymmetric key pair in association with the device ID to the authentication authority over the ancillary communications network;

(c) receiving a second PIN from a user through user-input of the device;
(d) communicating the second PIN and a second primary identification over the ancillary communications network to the authentication authority;
(e) receiving an encrypted second passcode over the ancillary communications network from the authentication authority;
(f) decrypting the second passcode using the second key of the second asymmetric key pair; and
(g) displaying the second passcode to the user.

8. The computer-readable medium of claim 7, wherein the second primary identification comprises the device ID and the second domain ID.

9. Computer-readable medium having computer-executable instructions that perform a method comprising the steps of, during registration of an authorized user with respect to a network resource:
(a) generating a first asymmetric key pair generally unique to a domain ID;
(b) communicating a first key of the first asymmetric key pair in association with a device ID of a device to an authentication authority over an ancillary communications network;
(c) receiving a first key of an asymmetric key pair of the authentication authority over the ancillary communications network;
(d) receiving a PIN from a user through user-input of the device;
(e) encrypting the PIN using the fist key of the asymmetric key pair of the authentication authority;
(f) communicating the encrypted PIN over the ancillary communications network to the authentication authority in association with the device ID;
(g) receiving an encrypted registration code over the ancillary communications network from the authentication authority;
(h) decrypting the registration code using the second key of the first asymmetric key pair; and
(i) displaying the registration code to the user.

10. The computer-readable medium of claim 9, wherein the method further comprises the steps of, following registration of the authorized user:
(a) receiving a suspect PIN from a suspect user through the user-input of the device;
(b) communicating the suspect PIN and a first primary identification over the ancillary communications network to the authentication authority;
(c) receiving an encrypted passcode over the ancillary communications network from the authentication authority;
(d) decrypting the passcode using the second key of the first asymmetric key pair; and
(e) displaying the passcode to the suspect user.

11. The computer-readable medium of claim 10, wherein the first primary identification comprises the device ID and the domain ID.

12. The computer-readable medium of claim 9, wherein the method further comprises the steps of, during registration of the authorized user with respect to a second network resource:
(a) generating a second asymmetric key pair generally unique to a second domain ID;
(b) communicating a first key of the second asymmetric key pair in association with the device ID to the authentication authority over the ancillary communications network;
(c) receiving a first key of a second asymmetric key pair of the authentication authority over the ancillary communications network;
(d) receiving a second PIN from the user through user-input of the device;
(e) encrypting the second PIN using the fist key of the second asymmetric key pair of the authentication authority;
(f) communicating the encrypted PIN over the ancillary communications network to the authentication authority in association with the device ID;
(g) receiving an encrypted second registration code over the ancillary communications network from the authentication authority;
(h) decrypting the second registration code using the second key of the second asymmetric key pair; and
(i) displaying the second registration code to the user.

13. The computer-readable medium of claim 12, wherein the method further comprises the steps of, following registration of the authorized user with respect to the second network resource:
(a) receiving a suspect second PIN through the user-input of the device;
(b) communicating the suspect second PIN and a second primary identification over the ancillary communications network to the authentication authority;
(c) receiving an encrypted second passcode over the ancillary communications network from the authentication authority;
(d) decrypting the second passcode using the second key of the second asymmetric key pair; and
(e) displaying the second passcode.

14. The computer-readable medium of claim 12, wherein the second primary identification comprises the device ID and the second domain ID.

15. The computer-readable medium of claim 9, wherein the method further comprises the steps of,
(a) during registration of the authorized user, receiving a first key of a secondary asymmetric key pair of the authentication authority over the ancillary communications network; and
(b) after registration of the authorized user,
(i) receiving a challenge from an access authority from which access to the network resource is sought;
(ii) receiving a suspect PIN from a suspect user through the user-input of the device;
(iii) calculating a challenge response as a function of the challenge, the suspect PIN, and the first key of the secondary key pair of the authentication authority; and
(iv) displaying the challenge response to the suspect user.

16. The method of claim 15, wherein the challenge is received through the user-input of the device.

17. The method of claim 15, wherein the function comprises hashing the challenge, suspect PIN, and first key of the secondary key pair of the authentication authority.

18. A method for registering for access by an authorized user with respect to a network resource, comprising the steps of:
(a) generating a first asymmetric key pair generally unique to a device of the authorized user;
(b) communicating in association with a device ID of the device to an authentication authority over an ancillary communications network both a first key of the first asymmetric key pair and a PIN of the authorized user;

(c) receiving an encrypted registration code over the ancillary communications network from the authentication authority;
(d) decrypting the registration code using the second key of the first asymmetric key pair of the device; and
(e) communicating the registration code to an access authority over a communications network in association with a user ID that identifies the authorized user to the access authority.

19. A system in which an authorized user is registered with an authentication authority for later authenticating of a suspect user seeking to gain access from an access authority to a network resource, comprising the steps of:
   (a) generating within a device of the authorized user a first asymmetric key pair of the authorized user that is generally unique to the device, and
   (b) communicating with the device a first key of the first asymmetric key pair in association with a device ID of the device to the authentication authority over an ancillary communications network;
   (c) by the authentication authority,
      (i) receiving and maintaining the first key in association with the device ID, and
      (ii) communicating to the device of the authorized user over the ancillary communications network a first key of a first key asymmetric key pair of the authentication authority that is unique to a domain ID;
   (d) by the authorized user,
      (i) encrypting with the device using the fist key of the asymmetric key pair of the authentication authority a PIN of the authorized user that is entered into the device, and
      (ii) communicating the encrypted PIN in association with the device ID to the authentication authority over the ancillary communications network;
   (e) by the authentication authority,
      (i) decrypting the PIN and maintaining the PIN in association with the device ID and the domain ID,
      (ii) encrypting using the first key associated with the device ID a registration code, and
      (iii) communicating the registration code to the device of the authorized user over the ancillary communications network;
   (f) by the authorized user,
      (i) decrypting within the device the encrypted registration code using the second key of the first asymmetric key pair of the authorized user, and
      (ii) communicating over a communications network the registration code to an access authority in association with a user ID identifying the authorized user to the access authority; and
   (g) comparing the registration code received with the user ID with the registration code encrypted and sent to the authorized user.

20. A method of granting access to a suspect user seeking to access a network resource, comprising the steps of:
   (a) first,
      (i) maintaining credentials of the authorized user such that the credentials are retrievable based on the user ID,
      (ii) receiving a user ID, registration code, and suspect credentials,
      (iii) comparing the suspect credentials with the credentials maintained in association with the user ID, and
      (iv) upon a successful authentication of the user ID by matching the suspect credentials with the maintained credentials, communicating the user ID and registration code to an authentication authority; and
   (b) thereafter, granting access to the network resource to a suspect user upon,
      (i) receiving a user ID and passcode from the suspect user,
      (ii) communicating the user ID and passcode to the authentication authority, and
      (iii) receiving an indication of a successful passcode comparison by the authentication authority.

21. A method of upgrading a single-factor authentication system to a multi-factor authentication system wherein a suspect user seeks access to a network resource, the single-factor authentication system including the binding of a user ID with credentials of an authorized user, the method comprising the steps of:
   (a) initially,
      (i) binding a device ID of a device with a PIN,
      (ii) binding the device ID with a private key of the device, and
      (iii) binding the device ID with the user ID, including authenticating the user ID with the credentials; and
   (b) thereafter,
      (i) authenticating the device ID including, as part thereof, communicating from the device the device ID and the PIN over an ancillary communications network,
      (ii) authenticating the device including, as part thereof, communicating to the device a passcode encrypted with the public key corresponding to the device private key and decrypting the passcode using the device private key, and
      (iii) communicating the unencrypted passcode over a communications network with the user ID.

* * * * *